United States Patent
Muenzenberger

(10) Patent No.: US 12,123,534 B2
(45) Date of Patent: *Oct. 22, 2024

(54) FIRE PROTECTION SLEEVE

(71) Applicant: Hilti Aktiengesellschaft, Schaan (LI)

(72) Inventor: Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,924

(22) Filed: Jan. 12, 2023

(65) Prior Publication Data

US 2023/0160500 A1  May 25, 2023

Related U.S. Application Data

(63) Continuation of application No. 17/468,972, filed on Sep. 8, 2021, now Pat. No. 11,655,919, which is a
(Continued)

(30) Foreign Application Priority Data

Apr. 27, 2015 (EP) .................................. 15165180

(51) Int. Cl.
| | | |
|---|---|---|
| *F16L 5/04* | (2006.01) |
| *A62C 2/06* | (2006.01) |
| *A62C 3/16* | (2006.01) |
| *H02G 3/04* | (2006.01) |
| *H02G 3/22* | (2006.01) |

(52) U.S. Cl.
CPC ................ *F16L 5/04* (2013.01); *A62C 2/065* (2013.01); *A62C 3/16* (2013.01); *H02G 3/0412* (2013.01); *H02G 3/22* (2013.01)

(58) Field of Classification Search
CPC ... F16L 5/04; A62C 2/065; A62C 3/16; E04B 1/941; H02G 3/22; H02G 3/0412
See application file for complete search history.

(56) References Cited

U.S. PATENT DOCUMENTS

| | | | |
|---|---|---|---|
| 546,909 | A | 9/1895 | Spencer |
| 563,680 | A | 7/1896 | Nott |

(Continued)

FOREIGN PATENT DOCUMENTS

| | | |
|---|---|---|
| AU | B-30326/95 | 3/1996 |
| CA | 2 787 642 | 3/2013 |

(Continued)

OTHER PUBLICATIONS

Document 1, Filed Sep. 22, 2022, "Complaint for Patent Infringement" in Case 1:22-cv-01248-CFC (in the U.S. District Court for the District of Delaware).

(Continued)

*Primary Examiner* — Babajide A Demuren
(74) *Attorney, Agent, or Firm* — Grüneberg and Myers PLLC

(57) ABSTRACT

A firestop collar (10) for sealing of openings, especially of line penetrations (12), that pass through walls (11) or ceilings has a frame (16) and a block (20) of optionally intumescent material disposed therein, and is characterized in that an intumescent inlay (22) is disposed between the block (20) and the frame (16).

17 Claims, 2 Drawing Sheets

Related U.S. Application Data continuation of application No. 16/829,035, filed on Mar. 25, 2020, now Pat. No. 11,137,091, which is a continuation of application No. 16/292,429, filed on Mar. 5, 2019, now Pat. No. 10,641,417, which is a continuation of application No. 15/568,562, filed as application No. PCT/EP2016/059344 on Apr. 27, 2016, now Pat. No. 10,415,725.

(56) References Cited

U.S. PATENT DOCUMENTS

| | | |
|---|---|---|
| 694,670 A | 3/1902 | Schiek |
| 1,192,989 A | 8/1916 | Clifford |
| 3,143,208 A | 8/1964 | Sizemore, Jr. |
| 3,188,686 A | 6/1965 | Orcutt |
| 3,232,786 A | 2/1966 | Kellman |
| 3,369,129 A | 2/1968 | Wolterman |
| 4,109,423 A | 8/1978 | Perrain |
| 4,303,158 A | 12/1981 | Perkins |
| 4,338,412 A | 7/1982 | von Bonin |
| 4,367,295 A | 1/1983 | von Bonin |
| 4,380,593 A | 4/1983 | Von Bonin et al. |
| 4,401,716 A | 8/1983 | Tschudin-Mahrer |
| 4,460,804 A | 7/1984 | Svejkovsky |
| 4,538,389 A | 9/1985 | Heinen |
| 4,807,805 A | 2/1989 | Rutkowski |
| 4,850,385 A | 7/1989 | Harbeke |
| 4,854,009 A | 8/1989 | Brockhaus |
| 4,857,364 A | 8/1989 | von Bonin |
| 4,901,488 A | 2/1990 | Murota et al. |
| 4,916,800 A | 4/1990 | Harbeke |
| 4,951,442 A | 8/1990 | Harbeke, Jr. |
| 5,058,341 A | 10/1991 | Harbeke, Jr. |
| 5,090,710 A | 2/1992 | Flower |
| 5,103,609 A | 4/1992 | Thoreson et al. |
| 5,105,592 A | 4/1992 | MacMillan et al. |
| 5,173,515 A | 12/1992 | von Bonin et al. |
| 5,309,688 A | 5/1994 | Robertson |
| 5,331,946 A | 7/1994 | Yamini et al. |
| 5,347,767 A | 9/1994 | Roth |
| 5,351,448 A | 10/1994 | Gohlke et al. |
| 5,390,458 A | 2/1995 | Menchetti |
| 5,421,127 A | 6/1995 | Stefely |
| 5,452,551 A | 9/1995 | Charland et al. |
| 5,456,050 A | 10/1995 | Ward |
| 5,475,948 A | 12/1995 | Parke |
| 5,548,934 A | 8/1996 | Israelson |
| 5,586,739 A | 12/1996 | Gantner et al. |
| 5,765,318 A | 6/1998 | Michelsen |
| 5,836,424 A | 11/1998 | Allen |
| 5,934,333 A | 8/1999 | Münzenberger et al. |
| 5,947,159 A | 9/1999 | Takahashi |
| 5,970,670 A | 10/1999 | Hoffman |
| 6,018,126 A | 1/2000 | Castellani et al. |
| 6,029,412 A | 2/2000 | Gohlke |
| 6,114,623 A | 9/2000 | Bonilla et al. |
| 6,125,608 A | 10/2000 | Charlson |
| 6,172,052 B1 | 1/2001 | Cook et al. |
| 6,176,052 B1 | 1/2001 | Takahashi |
| 6,336,297 B1 | 1/2002 | Cornwall |
| 6,360,502 B1 | 3/2002 | Stahl, Jr. |
| 6,426,463 B2 | 7/2002 | Münzenberger et al. |
| 6,479,119 B1 | 11/2002 | Simpson |
| 6,572,948 B1 | 6/2003 | Dykhoff |
| 6,632,999 B2 | 10/2003 | Sempliner et al. |
| 6,718,100 B2 | 4/2004 | Morris |
| 6,725,615 B1 | 4/2004 | Porter |
| 6,732,481 B2 | 5/2004 | Stahl, Sr. |
| 6,783,345 B2 | 8/2004 | Morgan et al. |
| D502,147 S | 2/2005 | Stahl, Sr. |
| 6,848,227 B2 | 2/2005 | Whitty |
| 6,928,777 B2 | 8/2005 | Cordts |
| 6,935,080 B2 | 8/2005 | Allwein et al. |
| 7,240,905 B1 | 7/2007 | Stahl, Sr. |
| 7,373,761 B2 | 5/2008 | Stahl, Sr. |
| 7,375,277 B1 | 5/2008 | Skinner et al. |
| 7,427,050 B2 | 9/2008 | Stahl, Sr. et al. |
| 7,465,888 B2 | 12/2008 | Fischer et al. |
| 7,478,503 B2 | 1/2009 | Milani et al. |
| 7,523,590 B2 | 4/2009 | Stahl, Sr. |
| 7,560,644 B2 | 7/2009 | Ford et al. |
| 7,596,914 B2 | 10/2009 | Stahl, Sr. et al. |
| 7,681,365 B2 | 3/2010 | Klein |
| 7,685,792 B2 | 3/2010 | Stahl, Sr. et al. |
| 7,694,474 B1 | 4/2010 | Stahl, Sr. et al. |
| 7,712,791 B1 | 5/2010 | Whitehead |
| 7,797,893 B2 | 9/2010 | Stahl, Sr. et al. |
| 7,856,775 B2 | 12/2010 | Stahl, Jr. |
| 7,866,108 B2 | 1/2011 | Klein |
| 7,867,591 B2 | 1/2011 | Sieber et al. |
| 7,950,198 B2 | 5/2011 | Pilz et al. |
| 8,051,614 B1 | 11/2011 | Peck et al. |
| D657,232 S | 4/2012 | Stahl, Sr. et al. |
| 8,188,382 B2 | 5/2012 | Monden et al. |
| 8,266,854 B2 | 9/2012 | Reddicliffe |
| 8,349,426 B2 | 1/2013 | Deiss |
| 8,375,666 B2 | 2/2013 | Stahl, Jr. et al. |
| 8,393,121 B2 | 3/2013 | Beele |
| 8,397,451 B2 | 3/2013 | Pirner |
| 8,397,452 B2 | 3/2013 | Stahl, Sr. et al. |
| 8,584,415 B2 | 11/2013 | Stahl, Jr. et al. |
| 8,590,231 B2 | 11/2013 | Pilz |
| 8,595,999 B1 | 12/2013 | Pilz et al. |
| 8,671,632 B2 | 3/2014 | Pilz et al. |
| 8,672,275 B2 | 3/2014 | Van Walraven et al. |
| 8,683,762 B2 | 4/2014 | Rodriquez et al. |
| 8,739,482 B1 | 6/2014 | Feil, III et al. |
| 8,793,946 B2 | 8/2014 | Stahl, Jr. et al. |
| 8,826,599 B2 | 9/2014 | Stahl, Jr. |
| 8,833,478 B2 | 9/2014 | Zernach et al. |
| 8,869,475 B2 | 10/2014 | Lopes |
| 8,887,458 B2 | 11/2014 | Lopes |
| 8,910,949 B2 | 12/2014 | Åkesson |
| 8,911,206 B2 | 12/2014 | Campbell et al. |
| 8,955,275 B2 | 2/2015 | Stahl, Jr. |
| 8,967,438 B2 | 3/2015 | Russell et al. |
| 9,046,194 B2 | 6/2015 | Gandolfo et al. |
| 9,121,527 B2 | 9/2015 | Munzenberger et al. |
| 9,157,232 B2 | 10/2015 | Stahl, Jr. |
| 9,162,093 B2 | 10/2015 | Foerg et al. |
| 9,220,932 B2 | 12/2015 | Zernach et al. |
| 9,861,843 B2 | 1/2018 | Paetow et al. |
| 11,591,790 B2 | 2/2023 | Deiss |
| 2004/0030004 A1 | 2/2004 | Horacek et al. |
| 2004/0149390 A1 | 8/2004 | Monden et al. |
| 2005/0133242 A1 | 6/2005 | Kreutz |
| 2005/0139126 A1 | 6/2005 | Khan et al. |
| 2006/0037264 A1 | 2/2006 | Paetow et al. |
| 2006/0060369 A1 | 3/2006 | Hemingway et al. |
| 2006/0138251 A1 | 6/2006 | Stahl, Sr. |
| 2006/0160926 A1 | 7/2006 | Horacek et al. |
| 2007/0125018 A1 | 6/2007 | Stahl, Sr. |
| 2007/0151183 A1 | 7/2007 | Stahl, Sr. et al. |
| 2007/0175125 A1 | 8/2007 | Stahl, Sr. et al. |
| 2007/0204540 A1 | 9/2007 | Stahl, Sr. et al. |
| 2007/0212495 A1 | 9/2007 | Nuzzo |
| 2007/0261339 A1 | 11/2007 | Stahl, Sr. et al. |
| 2007/0261343 A1 | 11/2007 | Stahl, Sr. et al. |
| 2008/0134584 A1 | 6/2008 | McGhee |
| 2008/0309017 A1 | 12/2008 | Mattice |
| 2009/0049781 A1 | 2/2009 | Pilz et al. |
| 2009/0075539 A1 | 3/2009 | Dimanshteyn et al. |
| 2009/0126297 A1 | 5/2009 | Stahl, Jr. |
| 2010/0223878 A1 | 9/2010 | Lipka et al. |
| 2010/0326678 A1 | 12/2010 | Monden et al. |
| 2011/0011019 A1 | 1/2011 | Stahl, Jr. et al. |
| 2011/0030281 A1 | 2/2011 | Vulpitta |
| 2011/0088342 A1 | 4/2011 | Stahl, Sr. et al. |
| 2011/0094759 A1 | 4/2011 | Lopes |
| 2011/0143121 A1 | 6/2011 | Deiss |
| 2011/0180278 A1 | 7/2011 | Magnay et al. |
| 2012/0207961 A1 | 8/2012 | Drexl et al. |
| 2012/0304979 A1 | 12/2012 | Munzenberger et al. |
| 2013/0061544 A1 | 3/2013 | Stahl, Jr. et al. |

(56) References Cited

U.S. PATENT DOCUMENTS

| | | |
|---|---|---|
| 2013/0086856 A1 | 4/2013 | Paetow et al. |
| 2013/0091790 A1 | 4/2013 | Stahl, Jr. et al. |
| 2013/0097948 A1 | 4/2013 | Burgess |
| 2013/0161030 A1 | 6/2013 | Munzenberger et al. |
| 2013/0205694 A1 | 8/2013 | Stahl, Jr. |
| 2013/0277918 A1 | 10/2013 | Fitzgerald et al. |
| 2013/0307225 A1 | 11/2013 | Boyd |
| 2014/0007373 A1 | 1/2014 | Muenzenberger |
| 2014/0020915 A1 | 1/2014 | Lopes |
| 2014/0077043 A1 | 3/2014 | Foerg |
| 2014/0137494 A1 | 5/2014 | Stahl, Jr. et al. |
| 2014/0260015 A1 | 9/2014 | McConnell et al. |
| 2014/0360115 A1 | 12/2014 | Stahl, Jr. |
| 2015/0007515 A1 | 1/2015 | Stahi, Jr. |
| 2015/0047276 A1 | 2/2015 | Gandolfo et al. |
| 2015/0135622 A1 | 5/2015 | Muenzenberger et al. |
| 2015/0251028 A1 | 9/2015 | Klein et al. |
| 2015/0298155 A1 | 10/2015 | Sackler |
| 2017/0354836 A1 | 12/2017 | Lopes et al. |

FOREIGN PATENT DOCUMENTS

| | | | |
|---|---|---|---|
| CA | 2 841 523 | 9/2014 | |
| CA | 2 849 597 | 12/2014 | |
| DE | 216225 | 11/1909 | |
| DE | 2 043 784 | 4/1971 | |
| DE | 30 25 309 A1 | 2/1982 | |
| DE | 30 41 731 A1 | 6/1982 | |
| DE | 33 02 416 A1 | 7/1984 | |
| DE | 34 11 327 A1 | 10/1985 | |
| DE | 39 17 518 A1 | 12/1990 | |
| DE | 9411293 U1 * | 7/1994 | |
| DE | 196 53 503 A1 | 6/1998 | |
| DE | 198 18 769 | 11/1999 | |
| DE | 100 43 430 | 3/2002 | |
| DE | 103 26 775 | 4/2004 | |
| DE | 20 2004 004 605 | 8/2004 | |
| DE | 20 2005 004 339 U1 | 10/2005 | |
| DE | 20 2006 019 593 U1 | 4/2007 | |
| DE | 10 2008 003 120 | 5/2009 | |
| DE | 20 2009 005 996 | 8/2009 | |
| DE | 20 2011 100 855 | 7/2011 | |
| DE | 10 2010 054 621 | 6/2012 | |
| DE | 10 2011 105 576 | 12/2012 | |
| DE | 10 2011 089 531 A1 | 6/2013 | |
| DE | 20 2013 004 376 | 6/2013 | |
| DE | 20 2013 103 170 U1 | 9/2013 | |
| EP | 0 043 952 A2 | 1/1982 | |
| EP | 0 051 106 A1 | 5/1982 | |
| EP | 0 061 024 A1 | 9/1982 | |
| EP | 0 043 952 B1 | 2/1984 | |
| EP | 0 116 846 A1 | 8/1984 | |
| EP | 0 051 106 B1 | 3/1985 | |
| EP | 0 061 024 B1 | 5/1985 | |
| EP | 0 158 165 A1 | 10/1985 | |
| EP | 0 116 846 B1 | 9/1987 | |
| EP | 0 274 068 A2 | 7/1988 | |
| EP | 0 158 165 B1 | 1/1989 | |
| EP | 0 869 303 | 10/1998 | |
| EP | 0 982 522 | 3/2000 | |
| EP | 0 988 873 | 3/2000 | |
| EP | 1 313 192 | 5/2003 | |
| EP | 1 347 549 A1 | 9/2003 | |
| EP | 1 641 895 B1 | 6/2009 | |
| EP | 2 273 639 | 1/2011 | |
| EP | 2 339 708 | 6/2011 | |
| EP | 2 455 135 A2 | 5/2012 | |
| ES | 2 312 276 | 2/2009 | |
| FR | 2 675 532 | 10/1992 | |
| FR | 2 787 825 | 6/2000 | |
| GB | 2 111 624 | 7/1983 | |
| GB | 2 216 220 | 10/1989 | |
| GB | 2 233 725 | 1/1991 | |
| GB | 2 255 121 | 10/1992 | |
| GB | 2 281 859 | 3/1995 | |
| GB | 2 334 770 | 9/1999 | |
| GB | 2341797 A * | 3/2000 | ............ A62C 2/065 |
| GB | 2 444 400 | 6/2008 | |
| GB | 2 457 152 | 8/2009 | |
| IE | 902358 | 6/1991 | |
| JP | 2-286990 | 11/1990 | |
| JP | 2000-240854 | 9/2000 | |
| JP | 2003-056098 | 2/2003 | |
| JP | 2007-032631 | 2/2007 | |
| JP | 2008-121413 | 5/2008 | |
| JP | 2010-57757 | 3/2010 | |
| JP | 2011-074969 | 4/2011 | |
| JP | 4753850 | 8/2011 | |
| JP | 2011-190614 | 9/2011 | |
| JP | 2012-92644 | 5/2012 | |
| JP | 2014-148998 | 8/2014 | |
| JP | 2014-212617 | 11/2014 | |
| JP | 2015-057560 | 3/2015 | |
| KR | 2002-0083301 | 11/2002 | |
| KR | 10-2012-0139936 | 12/2012 | |
| NL | 8700459 | 9/1988 | |
| RU | 2 297 500 | 4/2007 | |
| WO | 1991/019540 A1 | 12/1991 | |
| WO | 96/24549 | 8/1996 | |
| WO | 97/04838 | 2/1997 | |
| WO | 97/08485 | 3/1997 | |
| WO | 99/58199 | 11/1999 | |
| WO | 2002/037011 | 5/2002 | |
| WO | 2004/015319 | 2/2004 | |
| WO | 2007/061572 | 5/2007 | |
| WO | 2008/140399 | 11/2008 | |
| WO | 2013/160776 | 10/2013 | |
| WO | 2014/071362 | 5/2014 | |
| WO | 2014/081446 | 5/2014 | |
| WO | 2015/023313 | 2/2015 | |
| WO | 2015/055855 | 4/2015 | |
| WO | 2015/155492 | 10/2015 | |
| WO | 2016/089290 | 6/2016 | |

OTHER PUBLICATIONS

Exhibit 1 to Document 1, Filed Sep. 22, 2022, "Complaint for Patent Infringement" in Case 1:22-cv-01248-CFC (in the U.S. District Court for the District of Delaware).
Exhibit 2 to Document 1, Filed Sep. 22, 2022, "Complaint for Patent Infringement" in Case 1:22-cv-01248-CFC (in the U.S. District Court for the District of Delaware).
Exhibit 3 to Document 1, Filed Sep. 22, 2022, "Complaint for Patent Infringement" in Case 1:22-cv-01248-CFC (in the U.S. District Court for the District of Delaware).
Exhibit 4 to Document 1, Filed Sep. 22, 2022, "Complaint for Patent Infringement" in Case 1:22-cv-01248-CFC (in the U.S. District Court for the District of Delaware).
Exhibit 5 to Document 1, Filed Sep. 22, 2022, "Complaint for Patent Infringement" in Case 1:22-cv-01248-CFC (in the U.S. District Court for the District of Delaware).
Exhibit 6 to Document 1, Filed Sep. 22, 2022, "Complaint for Patent Infringement" in Case 1:22-cv-01248-CFC (in the U.S. District Court for the District of Delaware).
Exhibit 7 to Document 1, Filed Sep. 22, 2022, "Complaint for Patent Infringement" in Case 1:22-cv-01248-CFC (in the U.S. District Court for the District of Delaware).
Exhibit 8 to Document 1, Filed Sep. 22, 2022, "Complaint for Patent Infringement" in Case 1:22-cv-01248-CFC (in the U.S. District Court for the District of Delaware).
Exhibit 9 to Document 1, Filed Sep. 22, 2022, "Complaint for Patent Infringement" in Case 1:22-cv-01248-CFC (in the U.S. District Court for the District of Delaware).
Exhibit 10 to Document 1, Filed Sep. 22, 2022, "Complaint for Patent Infringement" in Case 1:22-cv-01248-CFC (in the U.S. District Court for the District of Delaware).
Exhibit 11 to Document 1, Filed Sep. 22, 2022, "Complaint for Patent Infringement" in Case 1:22-cv-01248-CFC (in the U.S. District Court for the District of Delaware).

(56) References Cited

OTHER PUBLICATIONS

Exhibit 12 to Document 1, Filed Sep. 22, 2022, "Complaint for Patent Infringement" in Case 1:22-cv-01248-CFC (in the U.S. District Court for the District of Delaware).
Exhibit 13 to Document 1, Filed Sep. 22, 2022, "Complaint for Patent Infringement" in Case 1:22-cv-01248-CFC (in the U.S. District Court for the District of Delaware).
Exhibit 14 to Document 1, Filed Sep. 22, 2022, "Complaint for Patent Infringement" in Case 1:22-cv-01248-CFC (in the U.S. District Court for the District of Delaware).
Exhibit 15 to Document 1, Filed Sep. 22, 2022, "Complaint for Patent Infringement" in Case 1:22-cv-01248-CFC (in the U.S. District Court for the District of Delaware).
Exhibit 16 to Document 1, Filed Sep. 22, 2022, "Complaint for Patent Infringement" in Case 1:22-cv-01248-CFC (in the U.S. District Court for the District of Delaware).
Exhibit 17 to Document 1, Filed Sep. 22, 2022, "Complaint for Patent Infringement" in Case 1:22-cv-01248-CFC (in the U.S. District Court for the District of Delaware).
Exhibit 18 to Document 1, Filed Sep. 22, 2022, "Complaint for Patent Infringement" in Case 1:22-cv-01248-CFC (in the U.S. District Court for the District of Delaware).
Exhibit 19 to Document 1, Filed Sep. 22, 2022, "Complaint for Patent Infringement" in Case 1:22-cv-01248-CFC (in the U.S. District Court for the District of Delaware).
Exhibit 20 to Document 1, Filed Sep. 22, 2022, "Complaint for Patent Infringement" in Case 1:22-cv-01248-CFC (in the U.S. District Court for the District of Delaware).
Exhibit 21 to Document 1, Filed Sep. 22, 2022, "Complaint for Patent Infringement" in Case 1:22-cv-01248-CFC (in the U.S. District Court for the District of Delaware).
Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 1 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 2 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 3 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 4 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 5 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 6 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 7 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 8 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 9 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 10 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 11 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 12 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 13 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 14 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 15 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 16 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 17 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 18 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 19 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 20 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 21 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 22 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 23 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 24 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 25 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 26 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 27 to Document 13, Filed Nov. 21, 2022, "Specified Technologies, Inc.'s Answer to Complaint for Patent Infringement,

(56) References Cited

OTHER PUBLICATIONS

Defenses, and Counterclaims" in Case 1:22-cv-01248-CFC (in the U.S. District Court for the District of Delaware).
Exhibit 28 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 29 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 30 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 31 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 32 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 33 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 34 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 35 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 36 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 37 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 38 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 39 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 40 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 41 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 42 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 43 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 44 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 45 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
International Search Report for PCT/EP2016/059344, mailed on Jul. 14, 2016, with English translation.
International Preliminary Report on Patentablility for PCT/EP2016/059344 dated Oct. 31, 2017.
Written Opinion of the International Searching Authority for PCT/EP2016/059344, mailed on Jul. 14, 2016, with English translation.
Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 1 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 2 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 3 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 4 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 5 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 6 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 7 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 8 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 9 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 10 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 11 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 12 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 13 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 14 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 15 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 16 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 17 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 18 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 19 to Document filed Jun. 30, 2023, "Plaintiff Hilti Aktiengesellschaft 's Invalidity Contentions" in Case 1:22-cv-01248-CJB (in the U.S. District Court for the District of Delaware).

(56) References Cited

OTHER PUBLICATIONS

Exhibit 20 to Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003902-0003907 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003908-0003915 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003916-0003920 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003921-0003930 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003931-0003934 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003935-0003940 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003941-0003946 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003947-0003957 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003958-0003962 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003963-0003978 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003983-0003986 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003987-0003993 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003994-0003997 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003998-0004008 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004009-0004014 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004015-0004021 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004022-0004042 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004043-0004067 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004094-0004115 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004116-0004128 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004129-0004143 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004144-0004155 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004156-0004165 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004166-0004172 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004173-0004197 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004217-0004232 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004233-0004242 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004243-0004265 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004266-0004297 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004298-0004318 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004340-0004376 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003900-0003901 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003979-0003982 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004068-0004069 filed with Document filed Jun. 30, 2023, "Plaintiff Hilti Aktiengesellschaft's Invalidity Contentions" in Case 1:22-cv-01248-CJB (in the U.S. District Court for the District of Delaware).

(56) References Cited

OTHER PUBLICATIONS

Document 1248HILTI0004070-0004081 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004082-0004093 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004377-0004378 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004379 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004380-0004383 filed with Document filed Jun. 30, 2023. "Plaintiff Hilti Aktiengesellschaft's Invalidity Contentions" in Case 1:22-cv-01248-CJB (in the U.S. District Court for the District of Delaware).
Document 1248HILTI0004384 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004385 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004386 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004387 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004388 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004389 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004390 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004393 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004394 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004395 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004396 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004397 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004398 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004399 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004400 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004401 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004402 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004403 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004404 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004405-0004406 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004407-0004433 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004459-0004460 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004461-0004465 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004466-0004469 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004470-0004471 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004472 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004473 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004474-0004485 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004486-0004487 filed with Document filed Jun. 30, 2023, "Plaintiff Hilti Aktiengesellschaft's Invalidity Contentions" In Case 1:22-cv-01248-CJB (in the U.S. District Court for the District of Delaware).
Document 1248HILTI0004491-0004493 filed with Document filed Jun. 30, 2023, "Plaintiff Hilti Aktiengesellschaft's Invalidity Contentions" in Case 1:22-cv-01248-CJB (in the U.S. District Court for the District of Delaware).

(56) References Cited

OTHER PUBLICATIONS

Document 1248HILTI0004494-0004534 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004391 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004392 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document filed Jun. 30, 2023, "Specified Technologies Inc.'s Invalidity Contentions" in Case 1:22-cv-01248-CJB (in the U.S. District Court for the District of Delaware).
Exhibit D-1 to Document filed Jun. 30, 2023, "Specified Technologies Inc.'s Invalidity Contentions" in Case 1:22-cv-01248-CJB (in the U.S. District Court for the District of Delaware).
Exhibit D-2 to Document filed Jun. 30, 2023, "Specified Technologies Inc.'s Invalidity Contentions" in Case 1:22-cv-01248-CJB (in the U.S. District Court for the District of Delaware).
Exhibit D-3 to Document filed Jun. 30, 2023, "Specified Technologies Inc.'s Invalidity Contentions" in Case 1:22-cv-01248-CJB (in the U.S. District Court for the District of Delaware).
Exhibit D-4 to Document filed Jun. 30, 2023, "Specified Technologies Inc.'s Invalidity Contentions" in Case 1:22-cv-01248-CJB (in the U.S. District Court for the District of Delaware).
Exhibit D-5 to Document filed Jun. 30, 2023, "Specified Technologies Inc.'s Invalidity Contentions" in Case 1:22-cv-01248-CJB (in the U.S. District Court for the District of Delaware).
Exhibit D-6 to Document filed Jun. 30, 2023, "Specified Technologies Inc.'s Invalidity Contentions" in Case 1:22-cv-01248-CJB (in the U.S. District Court for the District of Delaware).
Exhibit D-7 to Document filed Jun. 30, 2023, "Specified Technologies Inc.'s Invalidity Contentions" in Case 1:22-cv-01248-CJB (in the U.S. District Court for the District of Delaware).
Exhibit D-8 to Document filed Jun. 30, 2023, "Specified Technologies Inc.'s Invalidity Contentions" in Case 1:22-cv-01248-CJB (in the U.S. District Court for the District of Delaware).
Exhibit D-9 to Document filed Jun. 30, 2023, "Specified Technologies Inc.'s Invalidity Contentions" in Case 1:22-cv-01248-CJB (in the U.S. District Court for the District of Delaware).
Exhibit D-10 to Document filed Jun. 30, 2023, "Specified Technologies Inc.'s Invalidity Contentions" in Case 1:22-cv-01248-CJB (in the U.S. District Court for the District of Delaware).
Exhibit D-11 to Document filed Jun. 30, 2023, "Specified Technologies Inc.'s Invalidity Contentions" in Case 1:22-cv-01248-CJB (in the U.S. District Court for the District of Delaware).
Exhibit D-12 to Document filed Jun. 30, 2023, "Specified Technologies Inc.'s Invalidity Contentions" in Case 1:22-cv-01248-CJB (in the U.S. District Court for the District of Delaware).
Exhibit D-13 to Document filed Jun. 30, 2023, "Specified Technologies Inc.'s Invalidity Contentions" in Case 1:22-cv-01248-CJB (in the U.S. District Court for the District of Delaware).
Exhibit D-14 to Document filed Jun. 30, 2023, "Specified Technologies Inc.'s Invalidity Contentions" in Case 1:22-cv-01248-CJB (in the U.S. District Court for the District of Delaware).
Exhibit D-15 to Document filed Jun. 30, 2023, "Specified Technologies Inc.'s Invalidity Contentions" in Case 1:22-cv-01248-CJB (in the U.S. District Court for the District of Delaware).
Exhibit D-16 to Document filed Jun. 30, 2023, "Specified Technologies Inc.'s Invalidity Contentions" in Case 1:22-cv-01248-CJB (in the U.S. District Court for the District of Delaware).
Exhibit A-1 to Document filed Jun. 30, 2023, "Specified Technologies Inc.'s Invalidity Contentions" in Case 1:22-cv-01248-CJB (in the U.S. District Court for the District of Delaware).
Exhibit A-2 to Document filed Jun. 30, 2023, "Specified Technologies Inc.'s Invalidity Contentions" in Case 1:22-cv-01248-CJB (in the U.S. District Court for the District of Delaware).
Exhibit A-3 to Document filed Jun. 30, 2023, "Specified Technologies Inc.'s Invalidity Contentions" in Case 1:22-cv-01248-CJB (in the U.S. District Court for the District of Delaware).
Exhibit A-4 to Document filed Jun. 30, 2023, "Specified Technologies Inc.'s Invalidity Contentions" in Case 1:22-cv-01248-CJB (in the U.S. District Court for the District of Delaware).
Exhibit A-5 to Document filed Jun. 30, 2023, "Specified Technologies Inc.'s Invalidity Contentions" in Case 1:22-cv-01248-CJB (in the U.S. District Court for the District of Delaware).
Exhibit A-6 to Document filed Jun. 30, 2023, "Specified Technologies Inc.'s Invalidity Contentions" in Case 1:22-cv-01248-CJB (in the U.S. District Court for the District of Delaware).
Exhibit A-7 to Document filed Jun. 30, 2023, "Specified Technologies Inc.'s Invalidity Contentions" in Case 1:22-cv-01248-CJB (in the U.S. District Court for the District of Delaware).
Exhibit A-8 to Document filed Jun. 30, 2023, "Specified Technologies Inc.'s Invalidity Contentions" in Case 1:22-cv-01248-CJB (in the U.S. District Court for the District of Delaware).
Exhibit A-9 to Document filed Jun. 30, 2023, "Specified Technologies Inc.'s Invalidity Contentions" in Case 1:22-cv-01248-CJB (in the U.S. District Court for the District of Delaware).
Exhibit A-10 to Document filed Jun. 30, 2023, "Specified Technologies Inc.'s Invalidity Contentions" in Case 1:22-cv-01248-CJB (in the U.S. District Court for the District of Delaware).
Exhibit A-11 to Document filed Jun. 30, 2023, "Specified Technologies Inc.'s Invalidity Contentions" in Case 1:22-cv-01248-CJB (in the U.S. District Court for the District of Delaware).
Exhibit A-12 to Document filed Jun. 30, 2023, "Specified Technologies Inc.'s Invalidity Contentions" in Case 1:22-cv-01248-CJB (in the U.S. District Court for the District of Delaware).
Exhibit A-13 to Document filed Jun. 30, 2023, "Specified Technologies Inc.'s Invalidity Contentions" in Case 1:22-cv-01248-CJB (in the U.S. District Court for the District of Delaware).
Exhibit A-14 to Document filed Jun. 30, 2023, "Specified Technologies Inc.'s Invalidity Contentions" in Case 1:22-cv-01248-CJB (in the U.S. District Court for the District of Delaware).
Exhibit A-15 to Document filed Jun. 30, 2023, "Specified Technologies Inc.'s Invalidity Contentions" in Case 1:22-cv-01248-CJB (in the U.S. District Court for the District of Delaware).
Exhibit A-16 to Document filed Jun. 30, 2023, "Specified Technologies Inc.'s Invalidity Contentions" in Case 1:22-cv-01248-CJB (in the U.S. District Court for the District of Delaware).
Exhibit A-17 to Document filed Jun. 30, 2023, "Specified Technologies Inc.'s Invalidity Contentions" in Case 1:22-cv-01248-CJB (in the U.S. District Court for the District of Delaware).
Exhibit A-18 to Document filed Jun. 30, 2023, "Specified Technologies Inc.'s Invalidity Contentions" in Case 1:22-cv-01248-CJB (in the U.S. District Court for the District of Delaware).
Exhibit B-1 to Document filed Jun. 30, 2023, "Specified Technologies Inc.'s Invalidity Contentions" in Case 1:22-cv-01248-CJB (in the U.S. District Court for the District of Delaware).
Exhibit B-2 to Document filed Jun. 30, 2023, "Specified Technologies Inc.'s Invalidity Contentions" in Case 1:22-cv-01248-CJB (in the U.S. District Court for the District of Delaware).
Exhibit B-3 to Document filed Jun. 30, 2023, "Specified Technologies Inc.'s Invalidity Contentions" in Case 1:22-cv-01248-CJB (in the U.S. District Court for the District of Delaware).
Exhibit B-4 to Document filed Jun. 30, 2023, "Specified Technologies Inc.'s Invalidity Contentions" in Case 1:22-cv-01248-CJB (in the U.S. District Court for the District of Delaware).
Exhibit B-5 to Document filed Jun. 30, 2023, "Specified Technologies Inc.'s Invalidity Contentions" in Case 1:22-cv-01248-CJB (in the U.S. District Court for the District of Delaware).
Exhibit B-6 to Document filed Jun. 30, 2023, "Specified Technologies Inc.'s Invalidity Contentions" in Case 1:22-cv-01248-CJB (in the U.S. District Court for the District of Delaware).
Exhibit B-7 to Document filed Jun. 30, 2023, "Specified Technologies Inc.'s Invalidity Contentions" in Case 1:22-cv-01248-CJB (in the U.S. District Court for the District of Delaware).
Exhibit B-8 to Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Exhibit B-9 to Document filed Jun. 30, 2023, "Specified Technologies Inc.'s Invalidity Contentions" in Case 1:22-cv-01248-CJB (in the U.S. District Court for the District of Delaware).
Exhibit B-10 to Document filed Jun. 30, 2023, "Specified Technologies Inc.'s Invalidity Contentions" in Case 1:22-cv-01248-CJB (in the U.S. District Court for the District of Delaware).
Exhibit B-11 to Document filed Jun. 30, 2023, "Specified Technologies Inc.'s Invalidity Contentions" in Case 1:22-cv-01248-CJB (in the U.S. District Court for the District of Delaware).
Exhibit B-12 to Document filed Jun. 30, 2023, "Specified Technologies Inc.'s Invalidity Contentions" in Case 1:22-cv-01248-CJB (in the U.S. District Court for the District of Delaware).
Exhibit B-13 to Document filed Jun. 30, 2023, "Specified Technologies Inc.'s Invalidity Contentions" in Case 1:22-cv-01248-CJB (in the U.S. District Court for the District of Delaware).
Exhibit B-14 to Document filed Jun. 30, 2023, "Specified Technologies Inc.'s Invalidity Contentions" in Case 1:22-cv-01248-CJB (in the U.S. District Court for the District of Delaware).
Exhibit B-15 to Document filed Jun. 30, 2023, "Specified Technologies Inc.'s Invalidity Contentions" in Case 1:22-cv-01248-CJB (in the U.S. District Court for the District of Delaware).
Exhibit B-16 to Document filed Jun. 30, 2023, "Specified Technologies Inc.'s Invalidity Contentions" in Case 1:22-cv-01248-CJB (in the U.S. District Court for the District of Delaware).
Exhibit B-17 to Document filed Jun. 30, 2023, "Specified Technologies Inc.'s Invalidity Contentions" in Case 1:22-cv-01248-CJB (in the U.S. District Court for the District of Delaware).
Exhibit B-18 to Document filed Jun. 30, 2023, "Specified Technologies Inc.'s Invalidity Contentions" in Case 1:22-cv-01248-CJB (in the U.S. District Court for the District of Delaware).
Exhibit I to Document filed Jun. 30, 2023, "Specified Technologies Inc.'s Invalidity Contentions" in Case 1:22-cv-01248-CJB (in the U.S. District Court for the District of Delaware).
Exhibit F to Document filed Jun. 30, 2023, "Specified Technologies Inc.'s Invalidity Contentions" in Case 1:22-cv-01248-CJB (in the U.S. District Court for the District of Delaware).
Exhibit H to Document filed Jun. 30, 2023, "Specified Technologies Inc.'s Invalidity Contentions" in Case 1:22-cv-01248-CJB (in the U.S. District Court for the District of Delaware).
Exhibit G to Document filed Jun. 30, 2023, "Specified Technologies Inc.'s Invalidity Contentions" in Case 1:22-cv-01248-CJB (in the U.S. District Court for the District of Delaware).
Exhibit E-1 to Document filed Jun. 30, 2023, "Specified Technologies Inc.'s Invalidity Contentions" in Case 1:22-cv-01248-CJB (in the U.S. District Court for the District of Delaware).
Exhibit E-2 to Document filed Jun. 30, 2023, "Specified Technologies Inc.'s Invalidity Contentions" in Case 1:22-cv-01248-CJB (in the U.S. District Court for the District of Delaware).
Exhibit E-3 to Document filed Jun. 30, 2023, "Specified Technologies Inc.'s Invalidity Contentions" in Case 1:22-cv-01248-CJB (in the U.S. District Court for the District of Delaware).
Exhibit E-4 to Document filed Jun. 30, 2023, "Specified Technologies Inc.'s Invalidity Contentions" in Case 1:22-cv-01248-CJB (in the U.S. District Court for the District of Delaware).
Exhibit E-5 to Document filed Jun. 30, 2023, "Specified Technologies Inc.'s Invalidity Contentions" in Case 1:22-cv-01248-CJB (in the U.S. District Court for the District of Delaware).
Exhibit E-6 to Document filed Jun. 30, 2023, "Specified Technologies Inc.'s Invalidity Contentions" in Case 1:22-cv-01248-CJB (in the U.S. District Court for the District of Delaware).
Exhibit E-7 to Document filed Jun. 30, 2023, "Specified Technologies Inc.'s Invalidity Contentions" in Case 1:22-cv-01248-CJB (in the U.S. District Court for the District of Delaware).
Exhibit E-8 to Document filed Jun. 30, 2023, "Specified Technologies Inc.'s Invalidity Contentions" in Case 1:22-cv-01248-CJB (in the U.S. District Court for the District of Delaware).
Exhibit E-9 to Document filed Jun. 30, 2023, "Specified Technologies Inc.'s Invalidity Contentions" in Case 1:22-cv-01248-CJB (in the U.S. District Court for the District of Delaware).
Exhibit E-10 to Document filed Jun. 30, 2023, "Specified Technologies Inc.'s Invalidity Contentions" in Case 1:22-cv-01248-CJB (in the U.S. District Court for the District of Delaware).
Exhibit E-11 to Document filed Jun. 30, 2023, "Specified Technologies Inc.'s Invalidity Contentions" in Case 1:22-cv-01248-CJB (in the U.S. District Court for the District of Delaware).
Exhibit E-12 to Document filed Jun. 30, 2023, "Specified Technologies Inc.'s Invalidity Contentions" in Case 1:22-cv-01248-CJB (in the U.S. District Court for the District of Delaware).
Exhibit E-13 to Document filed Jun. 30, 2023, "Specified Technologies Inc.'s Invalidity Contentions" in Case 1:22-cv-01248-CJB (in the U.S. District Court for the District of Delaware).
Exhibit E-14 to Document filed Jun. 30, 2023, "Specified Technologies Inc.'s Invalidity Contentions" in Case 1:22-cv-01248-CJB (in the U.S. District Court for the District of Delaware).
Exhibit E-15 to Document filed Jun. 30, 2023, "Specified Technologies Inc.'s Invalidity Contentions" in Case 1:22-cv-01248-CJB (in the U.S. District Court for the District of Delaware).
Exhibit E-16 to Document filed Jun. 30, 2023, "Specified Technologies Inc.'s Invalidity Contentions" in Case 1:22-cv-01248-CJB (in the U.S. District Court for the District of Delaware).
Exhibit E-17 to Document filed Jun. 30, 2023, "Specified Technologies Inc.'s Invalidity Contentions" in Case 1:22-cv-01248-CJB (in the U.S. District Court for the District of Delaware).
Exhibit E-18 to Document filed Jun. 30, 2023, "Specified Technologies Inc.'s Invalidity Contentions" in Case 1:22-cv-01248-CJB (in the U.S. District Court for the District of Delaware).
Exhibit E-19 to Document filed Jun. 30, 2023, "Specified Technologies Inc.'s Invalidity Contentions" in Case 1:22-cv-01248-CJB (in the U.S. District Court for the District of Delaware).
Exhibit E-20 to Document filed Jun. 30, 2023, "Specified Technologies Inc.'s Invalidity Contentions" in Case 1:22-cv-01248-CJB (in the U.S. District Court for the District of Delaware).
Exhibit E-21 to Document filed Jun. 30, 2023, "Specified Technologies Inc.'s Invalidity Contentions" in Case 1:22-cv-01248-CJB (in the U.S. District Court for the District of Delaware).
Exhibit E-22 to Document filed Jun. 30, 2023, "Specified Technologies Inc.'s Invalidity Contentions" in Case 1:22-cv-01248-CJB (in the U.S. District Court for the District of Delaware).
Exhibit C-1 to Document filed Jun. 30, 2023, "Specified Technologies Inc.'s Invalidity Contentions" in Case 1:22-cv-01248-CJB (in the U.S. District Court for the District of Delaware).
Exhibit C-2 to Document filed Jun. 30, 2023, "Specified Technologies Inc.'s Invalidity Contentions" in Case 1:22-cv-01248-CJB (in the U.S. District Court for the District of Delaware).
Exhibit C-3 to Document filed Jun. 30, 2023, "Specified Technologies Inc.'s Invalidity Contentions" in Case 1:22-cv-01248-CJB (in the U.S. District Court for the District of Delaware).
Exhibit C-4 to Document filed Jun. 30, 2023, "Specified Technologies Inc.'s Invalidity Contentions" in Case 1:22-cv-01248-CJB (in the U.S. District Court for the District of Delaware).
Exhibit C-5 to Document filed Jun. 30, 2023, "Specified Technologies Inc.'s Invalidity Contentions" in Case 1:22-cv-01248-CJB (in the U.S. District Court for the District of Delaware).
Exhibit C-6 to Document filed Jun. 30, 2023, "Specified Technologies Inc.'s Invalidity Contentions" in Case 1:22-cv-01248-CJB (in the U.S. District Court for the District of Delaware).
Exhibit C-7 to Document filed Jun. 30, 2023, "Specified Technologies Inc.'s Invalidity Contentions" in Case 1:22-cv-01248-CJB (in the U.S. District Court for the District of Delaware).
Exhibit C-8 to Document filed Jun. 30, 2023, "Specified Technologies Inc.'s Invalidity Contentions" in Case 1:22-cv-01248-CJB (in the U.S. District Court for the District of Delaware).
Exhibit C-9 to Document filed Jun. 30, 2023, "Specified Technologies Inc.'s Invalidity Contentions" in Case 1:22-cv-01248-CJB (in the U.S. District Court for the District of Delaware).
Exhibit C-10 to Document filed Jun. 30, 2023, "Specified Technologies Inc.'s Invalidity Contentions" in Case 1:22-cv-01248-CJB (in the U.S. District Court for the District of Delaware).
Exhibit C-11 to Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Exhibit C-12 to Document filed Jun. 30, 2023, "Specified Technologies Inc.'s Invalidity Contentions" in Case 1:22-cv-01248-CJB (in the U.S. District Court for the District of Delaware).
Exhibit C-13 to Document filed Jun. 30, 2023, "Specified Technologies Inc.'s Invalidity Contentions" in Case 1:22-cv-01248-CJB (in the U.S. District Court for the District of Delaware).
Exhibit C-14 to Document filed Jun. 30, 2023, "Specified Technologies Inc.'s Invalidity Contentions" in Case 1:22-cv-01248-CJB (in the U.S. District Court for the District of Delaware).
Exhibit C-15 to Document filed Jun. 30, 2023, "Specified Technologies Inc.'s Invalidity Contentions" in Case 1:22-cv-01248-CJB (in the U.S. District Court for the District of Delaware).
Exhibit C-16 to Document filed Jun. 30, 2023, "Specified Technologies Inc.'s Invalidity Contentions" in Case 1:22-cv-01248-CJB (in the U.S. District Court for the District of Delaware).
Exhibit C-17 to Document filed Jun. 30, 2023, "Specified Technologies Inc.'s Invalidity Contentions" in Case 1:22-cv-01248-CJB (in the U.S. District Court for the District of Delaware).
Exhibit C-18 to Document filed Jun. 30, 2023, "Specified Technologies Inc.'s Invalidity Contentions" in Case 1:22-cv-01248-CJB (in the U.S. District Court for the District of Delaware).
Exhibit C-19 to Document filed Jun. 30, 2023, "Specified Technologies Inc.'s Invalidity Contentions" in Case 1:22-cv-01248-CJB (in the U.S. District Court for the District of Delaware).
Exhibit C-20 to Document filed Jun. 30, 2023, "Specified Technologies Inc.'s Invalidity Contentions" in Case 1:22-cv-01248-CJB (in the U.S. District Court for the District of Delaware).
Exhibit C-21 to Document filed Jun. 30, 2023, "Specified Technologies Inc.'s Invalidity Contentions" in Case 1:22-cv-01248-CJB (in the U.S. District Court for the District of Delaware).
Exhibit C-22 to Document filed Jun. 30, 2023, "Specified Technologies Inc.'s Invalidity Contentions" in Case 1:22-cv-01248-CJB (in the U.S. District Court for the District of Delaware).
Exhibit C-23 to Document filed Jun. 30, 2023, "Specified Technologies Inc.'s Invalidity Contentions" in Case 1:22-cv-01248-CJB (in the U.S. District Court for the District of Delaware).
Exhibit C-24 to Document filed Jun. 30, 2023, "Specified Technologies Inc.'s Invalidity Contentions" in Case 1:22-cv-01248-CJB (in the U.S. District Court for the District of Delaware).
Exhibit J to Document filed Jun. 30, 2023, "Specified Technologies Inc.'s Invalidity Contentions" in Case 1:22-cv-01248-CJB (in the U.S. District Court for the District of Delaware).
Exhibit K to Document filed Jun. 30, 2023, "Specified Technologies Inc.'s Invalidity Contentions" in Case 1:22-cv-01248-CJB (in the U.S. District Court for the District of Delaware).
Exhibit L to Document filed Jun. 30, 2023, "Specified Technologies Inc.'s Invalidity Contentions" in Case 1:22-cv-01248-CJB (in the U.S. District Court for the District of Delaware).
Exhibit M to Document filed Jun. 30, 2023, "Specified Technologies Inc.'s Invalidity Contentions" in Case 1:22-cv-01248-CJB (in the U.S. District Court for the District of Delaware).
Exhibit N to Document filed Jun. 30, 2023, "Specified Technologies Inc.'s Invalidity Contentions" in Case 1:22-cv-01248-CJB (in the U.S. District Court for the District of Delaware).
Exhibit O to Document filed Jun. 30, 2023, "Specified Technologies Inc.'s Invalidity Contentions" in Case 1:22-cv-01248-CJB (in the U.S. District Court for the District of Delaware).
Exhibit P to Document filed Jun. 30, 2023, "Specified Technologies Inc.'s Invalidity Contentions" in Case 1:22-cv-01248-CJB (in the U.S. District Court for the District of Delaware).
Exhibit Q to Document filed Jun. 30, 2023, "Specified Technologies Inc.'s Invalidity Contentions" in Case 1:22-cv-01248-CJB (in the U.S. District Court for the District of Delaware).
Document 1248HILTI0000473-0001118 filed with Document filed Jun. 30, 2023, "Specified Technologies Inc.'s Invalidity Contentions" in Case 1:22-cv-01248-CJB (in the U.S. District Court for the District of Delaware).
Document STI-1248-000018-000019 filed with Document filed Jun. 30, 2023, "Specified Technologies Inc.'s Invalidity Contentions" in Case 1:22-cv-01248-CJB (in the U.S. District Court for the District of Delaware).
Document STI-1248-000025 filed with Document filed Jun. 30, 2023, "Specified Technologies Inc.'s Invalidity Contentions" in Case 1:22-cv-01248-CJB (in the U.S. District Court for the District of Delaware).
Document STI-1248-000081 filed with Document filed Jun. 30, 2023, "Specified Technologies Inc.'s Invalidity Contentions" in Case 1:22-cv-01248-CJB (in the U.S. District Court for the District of Delaware).
Document STI-1248-000855-000862 filed with Document filed Jun. 30, 2023, "Specified Technologies Inc.'s Invalidity Contentions" in Case 1:22-cv-01248-CJB (in the U.S. District Court for the District of Delaware).
Document STI-1248-004141-004145 filed with Document filed Jun. 30, 2023, "Specified Technologies Inc.'s Invalidity Contentions" in Case 1:22-cv-01248-CJB (in the U.S. District Court for the District of Delaware).
Screen shots from STI-1248-004160, filed with Document filed Jun. 30, 2023, "Specified Technologies Inc.'s Invalidity Contentions" in Case 1:22-cv-01248-CJB (in the U.S. District Court for the District of Delaware).
Document STI-1248-004161-004168 filed with Document filed Jun. 30, 2023, "Specified Technologies Inc.'s Invalidity Contentions" in Case 1:22-cv-01248-CJB (in the U.S. District Court for the District of Delaware).
Document STI-1248-004270-004273 filed with Document filed Jun. 30, 2023, "Specified Technologies Inc.'s Invalidity Contentions" in Case 1:22-cv-01248-CJB (in the U.S. District Court for the District of Delaware).
Document STI-1248-004274-004311 filed with Document filed Jun. 30, 2023, "Specified Technologies Inc.'s Invalidity Contentions" in Case 1:22-cv-01248-CJB (in the U.S. District Court for the District of Delaware).
Document STI-1248-004312-004323 filed with Document filed Jun. 30, 2023, "Specified Technologies Inc.'s Invalidity Contentions" in Case 1:22-cv-01248-CJB (in the U.S. District Court for the District of Delaware).
Document STI-1248-004415-004420 filed with Document filed Jun. 30, 2023, "Specified Technologies Inc.'s Invalidity Contentions" in Case 1:22-cv-01248-CJB (in the U.S. District Court for the District of Delaware).
Document STI-1248-004421-004427 filed with Document filed Jun. 30, 2023, "Specified Technologies Inc.'s Invalidity Contentions" in Case 1:22-cv-01248-CJB (in the U.S. District Court for the District of Delaware).
Document STI-1248-004435-004436 filed with Document filed Jun. 30, 2023, "Specified Technologies Inc.'s Invalidity Contentions" in Case 1:22-cv-01248-CJB (in the U.S. District Court for the District of Delaware).
Document STI-1248-004491-004494 filed with Document filed Jun. 30, 2023, "Specified Technologies Inc.'s Invalidity Contentions" in Case 1:22-cv-01248-CJB (in the U.S. District Court for the District of Delaware).
Document STI-1248-004502-004545 filed with Document filed Jun. 30, 2023, "Specified Technologies Inc.'s Invalidity Contentions" in Case 1:22-cv-01248-CJB (in the U.S. District Court for the District of Delaware).
Document STI-1248-004546-004548 filed with Document filed Jun. 30, 2023, "Specified Technologies Inc.'s Invalidity Contentions" in Case 1:22-cv-01248-CJB (in the U.S. District Court for the District of Delaware).
Document STI-1248-004549-004592 filed with Document filed Jun. 30, 2023, "Specified Technologies Inc.'s Invalidity Contentions" in Case 1:22-cv-01248-CJB (in the U.S. District Court for the District of Delaware).
Document STI-1248-004593-004625 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-004626-004634 filed with Document filed Jun. 30, 2023, "Specified Technologies Inc.'s Invalidity Contentions" in Case 1:22-cv-01248-CJB (in the U.S. District Court for the District of Delaware).
Document STI-1248-004635-004645 filed with Document filed Jun. 30, 2023, "Specified Technologies Inc.'s Invalidity Contentions" in Case 1:22-cv-01248-CJB (in the U.S. District Court for the District of Delaware).
Document STI-1248-004646-004652 filed with Document filed Jun. 30, 2023, "Specified Technologies Inc.'s Invalidity Contentions" in Case 1:22-cv-01248-CJB (in the U.S. District Court for the District of Delaware).
Document STI-1248-004653-004663 filed with Document filed Jun. 30, 2023, "Specified Technologies Inc.'s Invalidity Contentions" in Case 1:22-cv-01248-CJB (in the U.S. District Court for the District of Delaware).
Document STI-1248-004664-004682 filed with Document filed Jun. 30, 2023, "Specified Technologies Inc.'s Invalidity Contentions" in Case 1:22-cv-01248-CJB (in the U.S. District Court for the District of Delaware).
Document STI-1248-004683-004695 filed with Document filed Jun. 30, 2023, "Specified Technologies Inc.'s Invalidity Contentions" in Case 1:22-cv-01248-CJB (in the U.S. District Court for the District of Delaware).
Document STI-1248-004696-004700 filed with Document filed Jun. 30, 2023, "Specified Technologies Inc.'s Invalidity Contentions" in Case 1:22-cv-01248-CJB (in the U.S. District Court for the District of Delaware).
Document STI-1248-004701-004714 filed with Document filed Jun. 30, 2023, "Specified Technologies Inc.'s Invalidity Contentions" in Case 1:22-cv-01248-CJB (in the U.S. District Court for the District of Delaware).
Document STI-1248-004715-004720 filed with Document filed Jun. 30, 2023, "Specified Technologies Inc.'s Invalidity Contentions" in Case 1:22-cv-01248-CJB (in the U.S. District Court for the District of Delaware).
Document STI-1248-004721-004730 filed with Document filed Jun. 30, 2023, "Specified Technologies Inc.'s Invalidity Contentions" in Case 1:22-cv-01248-CJB (in the U.S. District Court for the District of Delaware).
Document STI-1248-004731-004738 filed with Document filed Jun. 30, 2023, "Specified Technologies Inc.'s Invalidity Contentions" in Case 1:22-cv-01248-CJB (in the U.S. District Court for the District of Delaware).
Document STI-1248-004739-004744 filed with Document filed Jun. 30, 2023, "Specified Technologies Inc.'s Invalidity Contentions" in Case 1:22-cv-01248-CJB (in the U.S. District Court for the District of Delaware).
Document STI-1248-004745-004752 filed with Document filed Jun. 30, 2023, "Specified Technologies Inc.'s Invalidity Contentions" in Case 1:22-cv-01248-CJB (in the U.S. District Court for the District of Delaware).
Document STI-1248-004753-004765 filed with Document filed Jun. 30, 2023, "Specified Technologies Inc.'s Invalidity Contentions" in Case 1:22-cv-01248-CJB (in the U.S. District Court for the District of Delaware).
Document STI-1248-004766-004772 filed with Document filed Jun. 30, 2023. "Specified Technologies Inc.'s Invalidity Contentions" in Case 1:22-cv-01248-CJB (in the U.S. District Court for the District of Delaware).
Document STI-1248-004773-004789 filed with Document filed Jun. 30, 2023, "Specified Technologies Inc.'s Invalidity Contentions" in Case 1:22-cv-01248-CJB (in the U.S. District Court for the District of Delaware).
Document STI-1248-004790-004818 filed with Document filed Jun. 30, 2023, "Specified Technologies Inc.'s Invalidity Contentions" in Case 1:22-cv-01248-CJB (in the U.S. District Court for the District of Delaware).
Document STI-1248-004819-004827 filed with Document filed Jun. 30, 2023, "Specified Technologies Inc.'s Invalidity Contentions" in Case 1:22-cv-01248-CJB (in the U.S. District Court for the District of Delaware).
Document STI-1248-004828-004836 filed with Document filed Jun. 30, 2023, "Specified Technologies Inc.'s Invalidity Contentions" in Case 1:22-cv-01248-CJB (in the U.S. District Court for the District of Delaware).
Document STI-1248-004837-004850 filed with Document filed Jun. 30, 2023, "Specified Technologies Inc.'s Invalidity Contentions" in Case 1:22-cv-01248-CJB (in the U.S. District Court for the District of Delaware).
Document STI-1248-004851-004858 filed with Document filed Jun. 30, 2023, "Specified Technologies Inc.'s Invalidity Contentions" in Case 1:22-cv-01248-CJB (in the U.S. District Court for the District of Delaware).
Document STI-1248-004859-004867 filed with Document filed Jun. 30, 2023, "Specified Technologies Inc.'s Invalidity Contentions" in Case 1:22-cv-01248-CJB (in the U.S. District Court for the District of Delaware).
Document STI-1248-004868-004873 filed with Document filed Jun. 30, 2023, "Specified Technologies Inc.'s Invalidity Contentions" in Case 1:22-cv-01248-CJB (in the U.S. District Court for the District of Delaware).
Document STI-1248-004874-004878 filed with Document filed Jun. 30, 2023, "Specified Technologies Inc.'s Invalidity Contentions" in Case 1:22-cv-01248-CJB (in the U.S. District Court for the District of Delaware).
Document STI-1248-004879-004890 filed with Document filed Jun. 30, 2023, "Specified Technologies Inc.'s Invalidity Contentions" in Case 1:22-cv-01248-CJB (in the U.S. District Court for the District of Delaware).
Document STI-1248-004891-004901 filed with Document filed Jun. 30, 2023, "Specified Technologies Inc.'s Invalidity Contentions" in Case 1:22-cv-01248-CJB (in the U.S. District Court for the District of Delaware).
Document STI-1248-004902-004908 filed with Document filed Jun. 30, 2023, "Specified Technologies Inc.'s Invalidity Contentions" in Case 1:22-cv-01248-CJB (in the U.S. District Court for the District of Delaware).
Document STI-1248-004909-004919 filed with Document filed Jun. 30, 2023, "Specified Technologies Inc.'s Invalidity Contentions" in Case 1:22-cv-01248-CJB (in the U.S. District Court for the District of Delaware).
Document STI-1248-004920-004932 filed with Document filed Jun. 30, 2023, "Specified Technologies Inc.'s Invalidity Contentions" in Case 1:22-cv-01248-CJB (in the U.S. District Court for the District of Delaware).
Document STI-1248-004933-004943 filed with Document filed Jun. 30, 2023, "Specified Technologies Inc.'s Invalidity Contentions" in Case 1:22-cv-01248-CJB (in the U.S. District Court for the District of Delaware).
Document STI-1248-004944-004954 filed with Document filed Jun. 30, 2023, "Specified Technologies Inc.'s Invalidity Contentions" in Case 1:22-cv-01248-CJB (in the U.S. District Court for the District of Delaware).
Document STI-1248-004955-004977 filed with Document filed Jun. 30, 2023, "Specified Technologies Inc.'s Invalidity Contentions" in Case 1:22-cv-01248-CJB (in the U.S. District Court for the District of Delaware).
Document STI-1248-004978-004981 filed with Document filed Jun. 30, 2023, "Specified Technologies Inc.'s Invalidity Contentions" in Case 1:22-cv-01248-CJB (in the U.S. District Court for the District of Delaware).
Document STI-1248-004982-005000 filed with Document filed Jun. 30, 2023, "Specified Technologies Inc.'s Invalidity Contentions" in Case 1:22-cv-01248-CJB (in the U.S. District Court for the District of Delaware).
Document STI-1248-005001-005012 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005013-005037 filed with Document filed Jun. 30, 2023, "Specified Technologies Inc.'s Invalidity Contentions" in Case 1:22-cv-01248-CJB (in the U.S. District Court for the District of Delaware).
Document STI-1248-005038-005062 filed with Document filed Jun. 30, 2023, "Specified Technologies Inc.'s Invalidity Contentions" in Case 1:22-cv-01248-CJB (in the U.S. District Court for the District of Delaware).
Document STI-1248-005063-005075 filed with Document filed Jun. 30, 2023, "Specified Technologies Inc.'s Invalidity Contentions" in Case 1:22-cv-01248-CJB (in the U.S. District Court for the District of Delaware).
Document STI-1248-005076-005080 filed with Document filed Jun. 30, 2023, "Specified Technologies Inc.'s Invalidity Contentions" in Case 1:22-cv-01248-CJB (in the U.S. District Court for the District of Delaware).
Document STI-1248-005081-005083 filed with Document filed Jun. 30, 2023, "Specified Technologies Inc.'s Invalidity Contentions" in Case 1:22-cv-01248-CJB (in the U.S. District Court for the District of Delaware).
Document STI-1248-005084-005089 filed with Document filed Jun. 30, 2023, "Specified Technologies Inc.'s Invalidity Contentions" in Case 1:22-cv-01248-CJB (in the U.S. District Court for the District of Delaware).
Document STI-1248-005090-005120 filed with Document filed Jun. 30, 2023, "Specified Technologies Inc.'s Invalidity Contentions" in Case 1:22-cv-01248-CJB (in the U.S. District Court for the District of Delaware).
Document STI-1248-005121-005137 filed with Document filed Jun. 30, 2023, "Specified Technologies Inc.'s Invalidity Contentions" in Case 1:22-cv-01248-CJB (in the U.S. District Court for the District of Delaware).
Document STI-1248-005138-005158 filed with Document filed Jun. 30, 2023, "Specified Technologies Inc.'s Invalidity Contentions" in Case 1:22-cv-01248-CJB (in the U.S. District Court for the District of Delaware).
Document STI-1248-005159-005164 filed with Document filed Jun. 30, 2023, "Specified Technologies Inc.'s Invalidity Contentions" in Case 1:22-cv-01248-CJB (in the U.S. District Court for the District of Delaware).
Document STI-1248-005165-005183 filed with Document filed Jun. 30, 2023, "Specified Technologies Inc.'s Invalidity Contentions" in Case 1:22-cv-01248-CJB (in the U.S. District Court for the District of Delaware).
Document STI-1248-005184-005203 filed with Document filed Jun. 30, 2023, "Specified Technologies Inc.'s Invalidity Contentions" in Case 1:22-cv-01248-CJB (in the U.S. District Court for the District of Delaware).
Document STI-1248-005204-005210 filed with Document filed Jun. 30, 2023, "Specified Technologies Inc.'s Invalidity Contentions" in Case 1:22-cv-01248-CJB (in the U.S. District Court for the District of Delaware).
Document STI-1248-005211-005224 filed with Document filed Jun. 30, 2023, "Specified Technologies Inc.'s Invalidity Contentions" in Case 1:22-cv-01248-CJB (in the U.S. District Court for the District of Delaware).
Document STI-1248-005225-005229 filed with Document filed Jun. 30, 2023, "Specified Technologies Inc.'s Invalidity Contentions" in Case 1:22-cv-01248-CJB (in the U.S. District Court for the District of Delaware).
Document STI-1248-005230-005253 filed with Document filed Jun. 30, 2023, "Specified Technologies Inc.'s Invalidity Contentions" in Case 1:22-cv-01248-CJB (in the U.S. District Court for the District of Delaware).
Document STI-1248-005254-005262 filed with Document filed Jun. 30, 2023, "Specified Technologies Inc.'s Invalidity Contentions" in Case 1:22-cv-01248-CJB (in the U.S. District Court for the District of Delaware).
Document STI-1248-005263-005275 filed with Document filed Jun. 30, 2023, "Specified Technologies Inc.'s Invalidity Contentions" in Case 1:22-cv-01248-CJB (in the U.S. District Court for the District of Delaware).
Document STI-1248-005276-005286 filed with Document filed Jun. 30, 2023, "Specified Technologies Inc.'s Invalidity Contentions" in Case 1:22-cv-01248-CJB (in the U.S. District Court for the District of Delaware).
Document STI-1248-005287-005309 filed with Document filed Jun. 30, 2023, "Specified Technologies Inc.'s Invalidity Contentions" in Case 1:22-cv-01248-CJB (in the U.S. District Court for the District of Delaware).
Document STI-1248-005310-005320 filed with Document filed Jun. 30, 2023, "Specified Technologies Inc.'s Invalidity Contentions" in Case 1:22-cv-01248-CJB (in the U.S. District Court for the District of Delaware).
Document STI-1248-005321-005329 filed with Document filed Jun. 30, 2023, "Specified Technologies Inc.'s Invalidity Contentions" in Case 1:22-cv-01248-CJB (in the U.S. District Court for the District of Delaware).
Document STI-1248-005330-005335 filed with Document filed Jun. 30, 2023, "Specified Technologies Inc.'s Invalidity Contentions" in Case 1:22-cv-01248-CJB (in the U.S. District Court for the District of Delaware).
Document STI-1248-005336-005339 filed with Document filed Jun. 30, 2023, "Specified Technologies Inc.'s Invalidity Contentions" in Case 1:22-cv-01248-CJB (in the U.S. District Court for the District of Delaware).
Document STI-1248-005340-005345 filed with Document filed Jun. 30, 2023, "Specified Technologies Inc.'s Invalidity Contentions" in Case 1:22-cv-01248-CJB (in the U.S. District Court for the District of Delaware).
Document STI-1248-005346-005353 filed with Document filed Jun. 30, 2023, "Specified Technologies Inc.'s Invalidity Contentions" in Case 1:22-cv-01248-CJB (in the U.S. District Court for the District of Delaware).
Document STI-1248-005354-005356 filed with Document filed Jun. 30, 2023, "Specified Technologies Inc.'s Invalidity Contentions" in Case 1:22-cv-01248-CJB (in the U.S. District Court for the District of Delaware).
Document STI-1248-005357-005359 filed with Document filed Jun. 30, 2023, "Specified Technologies Inc.'s Invalidity Contentions" in Case 1:22-cv-01248-CJB (in the U.S. District Court for the District of Delaware).
Document STI-1248-005360-005361 filed with Document filed Jun. 30, 2023, "Specified Technologies Inc.'s Invalidity Contentions" in Case 1:22-cv-01248-CJB (in the U.S. District Court for the District of Delaware).
Document STI-1248-005755 filed with Document filed Jun. 30, 2023, "Specified Technologies Inc.'s Invalidity Contentions" in Case 1:22-cv-01248-CJB (in the U.S. District Court for the District of Delaware).
Document STI-1248-005759-005765 filed with Document filed Jun. 30, 2023, "Specified Technologies Inc.'s Invalidity Contentions" in Case 1:22-cv-01248-CJB (in the U.S. District Court for the District of Delaware).
Document STI-1248-000075-000077, filed with Document filed Jun. 30, 2023, "Specified Technologies Inc.'s Invalidity Contentions" in Case 1:22-cv-01248-CJB (in the U.S. District Court for the District of Delaware).
Document STI-1248-000078-000080, filed with Document filed Jun. 30, 2023, "Specified Technologies Inc.'s Invalidity Contentions" in Case 1:22-cv-01248-CJB (in the U.S. District Court for the District of Delaware).
Document STI-1248-000759, filed with Document filed Jun. 30, 2023, "Specified Technologies Inc.'s Invalidity Contentions" in Case 1:22-cv-01248-CJB (in the U.S. District Court for the District of Delaware).
Document STI-1248-000839-000842, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-000843-000852, filed with Document filed Jun. 30, 2023, "Specified Technologies Inc.'s Invalidity Contentions" in Case 1:22-cv-01248-CJB (in the U.S. District Court for the District of Delaware).
Document STI-1248-000987, filed with Document filed Jun. 30, 2023, "Specified Technologies Inc.'s Invalidity Contentions" in Case 1:22-cv-01248-CJB (in the U.S. District Court for the District of Delaware).
Document STI-1248-001780, filed with Document filed Jun. 30, 2023, "Specified Technologies Inc.'s Invalidity Contentions" in Case 1:22-cv-01248-CJB (in the U.S. District Court for the District of Delaware).
Document STI-1248-001781, filed with Document filed Jun. 30, 2023, "Specified Technologies Inc.'s Invalidity Contentions" in Case 1:22-cv-01248-CJB (in the U.S. District Court for the District of Delaware).
Document STI-1248-001782, filed with Document filed Jun. 30, 2023, "Specified Technologies Inc.'s Invalidity Contentions" in Case 1:22-cv-01248-CJB (in the U.S. District Court for the District of Delaware).
Document STI-1248-001804, filed with Document filed Jun. 30, 2023, "Specified Technologies Inc.'s Invalidity Contentions" in Case 1:22-cv-01248-CJB (in the U.S. District Court for the District of Delaware).
Document STI-1248-003735, filed with Document filed Jun. 30, 2023, "Specified Technologies Inc.'s Invalidity Contentions" in Case 1:22-cv-01248-CJB (in the U.S. District Court for the District of Delaware).
Document STI-1248-4148-4159, filed with Document filed Jun. 30, 2023, "Specified Technologies Inc.'s Invalidity Contentions" in Case 1:22-cv-01248-CJB (in the U.S. District Court for the District of Delaware).
Document STI-1248-4201, filed with Document filed Jun. 30, 2023, "Specified Technologies Inc.'s Invalidity Contentions" in Case 1:22-cv-01248-CJB (in the U.S. District Court for the District of Delaware).
Document STI-1248-4202, filed with Document filed Jun. 30, 2023, "Specified Technologies Inc.'s Invalidity Contentions" in Case 1:22-cv-01248-CJB (in the U.S. District Court for the District of Delaware).
Document STI-1248-4203, filed with Document filed Jun. 30, 2023, "Specified Technologies Inc.'s Invalidity Contentions" in Case 1:22-cv-01248-CJB (in the U.S. District Court for the District of Delaware).
Document STI-1248-4207, filed with Document filed Jun. 30, 2023, "Specified Technologies Inc.'s Invalidity Contentions" in Case 1:22-cv-01248-CJB (in the U.S. District Court for the District of Delaware).
Document STI-1248-4211, filed with Document filed Jun. 30, 2023, "Specified Technologies Inc.'s Invalidity Contentions" in Case 1:22-cv-01248-CJB (in the U.S. District Court for the District of Delaware).
Document STI-1248-4215, filed with Document filed Jun. 30, 2023, "Specified Technologies Inc.'s Invalidity Contentions" in Case 1:22-cv-01248-CJB (in the U.S. District Court for the District of Delaware).
Document STI-1248-4218, filed with Document filed Jun. 30, 2023, "Specified Technologies Inc.'s Invalidity Contentions" in Case 1:22-cv-01248-CJB (in the U.S. District Court for the District of Delaware).
Document STI-1248-4219, filed with Document filed Jun. 30, 2023, "Specified Technologies Inc.'s Invalidity Contentions" in Case 1:22-cv-01248-CJB (in the U.S. District Court for the District of Delaware).
Document STI-1248-4229, filed with Document filed Jun. 30, 2023, "Specified Technologies Inc.'s Invalidity Contentions" in Case 1:22-cv-01248-CJB (in the U.S. District Court for the District of Delaware).
Document STI-1248-4233, filed with Document filed Jun. 30, 2023, "Specified Technologies Inc.'s Invalidity Contentions" in Case 1:22-cv-01248-CJB (in the U.S. District Court for the District of Delaware).
Document STI-1248-4236, filed with Document filed Jun. 30, 2023, "Specified Technologies Inc.'s Invalidity Contentions" in Case 1:22-cv-01248-CJB (in the U.S. District Court for the District of Delaware).
Document STI-1248-4260, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005599, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005600, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005601, filed with Document filed Jun. 30, 2023, "Specified Technologies Inc.'s Invalidity Contentions" in Case 1:22-cv-01248-CJB (in the U.S. District Court for the District of Delaware).
Screen Shots from document STI-1248-005602, filed with Document filed Jun. 30 2023, "Specified Technologies Inc.'s Invalidity Contentions" in Case 1:22-cv-01248-CJB (in the U.S. District Court for the District of Delaware).
Transcript and screen shots from document STI-1248-005603, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005604, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005605, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005606, filed with Document filed Jun. 30, 2023, "Specified Technologies Inc.'s Invalidity Contentions" in Case 1:22-cv-01248-CJB (in the U.S. District Court for the District of Delaware).
Screen shots from document STI-1248-005607, filed with Document filed Jun. 30, 2023, "Specified Technologies Inc.'s Invalidity Contentions" in Case 1:22-cv-01248-CJB (in the U.S. District Court for the District of Delaware).
Screen shots from document STI-1248-005608, filed with Document filed Jun. 30, 2023, "Specified Technologies Inc.'s Invalidity Contentions" in Case 1:22-cv-01248-CJB (in the U.S. District Court for the District of Delaware).
Document STI-1248-5748, filed with Document filed Jun. 30, 2023, "Specified Technologies Inc.'s Invalidity Contentions" in Case 1:22-cv-01248-CJB (in the U.S. District Court for the District of Delaware).
Document STI-1248-5749, filed with Document filed Jun. 30, 2023, "Specified Technologies Inc.'s Invalidity Contentions" in Case 1:22-cv-01248-CJB (in the U.S. District Court for the District of Delaware).
Document STI-1248-5750, filed with Document filed Jun. 30, 2023, "Specified Technologies Inc.'s Invalidity Contentions" in Case 1:22-cv-01248-CJB (in the U.S. District Court for the District of Delaware).
Document STI-1248-5751, filed with Document filed Jun. 30, 2023, "Specified Technologies Inc.'s Invalidity Contentions" in Case 1:22-cv-01248-CJB (in the U.S. District Court for the District of Delaware).
Document STI-1248-5752, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-5753, filed with Document filed Jun. 30, 2023, "Specified Technologies Inc.'s Invalidity Contentions" in Case 1:22-cv-01248-CJB (in the U.S. District Court for the District of Delaware).
Document STI-1248-5754, filed with Document filed Jun. 30, 2023, "Specified Technologies Inc.'s Invalidity Contentions" in Case 1:22-cv-01248-CJB (in the U.S. District Court for the District of Delaware).
Document STI-1248-5756, filed with Document filed Jun. 30, 2023, "Specified Technologies Inc.'s Invalidity Contentions" in Case 1:22-cv-01248-CJB (in the U.S. District Court for the District of Delaware).
Document STI-1248-5757, filed with Document filed Jun. 30, 2023, "Specified Technologies Inc.'s Invalidity Contentions" in Case 1:22-cv-01248-CJB (in the U.S. District Court for the District of Delaware).
Document STI-1248-5758, filed with Document filed Jun. 30, 2023, "Specified Technologies Inc.'s Invalidity Contentions" in Case 1:22-cv-01248-CJB (in the U.S. District Court for the District of Delaware).
Document STI-1248-000040, filed with Document filed Jun. 30, 2023, "Specified Technologies Inc.'s Invalidity Contentions" in Case 1:22-cv-01248-CJB (in the U.S. District Court for the District of Delaware).
Document STI-1248-000041, filed with Document filed Jun. 30, 2023, "Specified Technologies Inc.'s Invalidity Contentions" in Case 1:22-cv-01248-CJB (in the U.S. District Court for the District of Delaware).
Document STI-1248-000054, filed with Document filed Jun. 30, 2023, "Specified Technologies Inc.'s Invalidity Contentions" in Case 1:22-cv-01248-CJB (in the U.S. District Court for the District of Delaware).
Document STI-1248-000055, filed with Document filed Jun. 30, 2023, "Specified Technologies Inc.'s Invalidity Contentions" in Case 1:22-cv-01248-CJB (in the U.S. District Court for the District of Delaware).
Document STI-1248-000056, filed with Document filed Jun. 30, 2023, "Specified Technologies Inc.'s Invalidity Contentions" in Case 1:22-cv-01248-CJB (in the U.S. District Court for the District of Delaware).
Document STI-1248-000071, filed with Document filed Jun. 30, 2023, "Specified Technologies Inc.'s Invalidity Contentions" in Case 1:22-cv-01248-CJB (in the U.S. District Court for the District of Delaware).
Document STI-1248-000720, filed with Document filed Jun. 30, 2023, "Specified Technologies Inc.'s Invalidity Contentions" in Case 1:22-cv-01248-CJB (in the U.S. District Court for the District of Delaware).
Document STI-1248-000760, filed with Document filed Jun. 30, 2023, "Specified Technologies Inc.'s Invalidity Contentions" in Case 1:22-cv-01248-CJB (in the U.S. District Court for the District of Delaware).
Document STI-1248-000786, filed with Document filed Jun. 30, 2023, "Specified Technologies Inc.'s Invalidity Contentions" in Case 1:22-cv-01248-CJB (in the U.S. District Court for the District of Delaware).
Document STI-1248-000810, filed with Document filed Jun. 30, 2023, "Specified Technologies Inc.'s Invalidity Contentions" in Case 1:22-cv-01248-CJB (in the U.S. District Court for the District of Delaware).
Document STI-1248-000826, filed with Document filed Jun. 30, 2023, "Specified Technologies Inc.'s Invalidity Contentions" in Case 1:22-cv-01248-CJB (in the U.S. District Court for the District of Delaware).
Document STI-1248-000864, filed with Document filed Jun. 30, 2023, "Specified Technologies Inc.'s Invalidity Contentions" in Case 1:22-cv-01248-CJB (in the U.S. District Court for the District of Delaware).
Document STI-1248-000889, filed with Document filed Jun. 30, 2023, "Specified Technologies Inc.'s Invalidity Contentions" in Case 1:22-cv-01248-CJB (in the U.S. District Court for the District of Delaware).
Document STI-1248-000913, filed with Document filed Jun. 30, 2023, "Specified Technologies Inc.'s Invalidity Contentions" in Case 1:22-cv-01248-CJB (in the U.S. District Court for the District of Delaware).
Document STI-1248-000960, filed with Document filed Jun. 30, 2023, "Specified Technologies Inc.'s Invalidity Contentions" in Case 1:22-cv-01248-CJB (in the U.S. District Court for the District of Delaware).
Document STI-1248-000974, filed with Document filed Jun. 30, 2023, "Specified Technologies Inc.'s Invalidity Contentions" in Case 1:22-cv-01248-CJB (in the U.S. District Court for the District of Delaware).
Document STI-1248-000975, filed with Document filed Jun. 30, 2023, "Specified Technologies Inc.'s Invalidity Contentions" in Case 1:22-cv-01248-CJB (in the U.S. District Court for the District of Delaware).
Document STI-1248-000988, filed with Document filed Jun. 30, 2023, "Specified Technologies Inc.'s Invalidity Contentions" in Case 1:22-cv-01248-CJB (in the U.S. District Court for the District of Delaware).
Document STI-1248-000989, filed with Document filed Jun. 30, 2023, "Specified Technologies Inc.'s Invalidity Contentions" in Case 1:22-cv-01248-CJB (in the U.S. District Court for the District of Delaware).
Document STI-1248-000990, filed with Document filed Jun. 30, 2023, "Specified Technologies Inc.'s Invalidity Contentions" in Case 1:22-cv-01248-CJB (in the U.S. District Court for the District of Delaware).
Document STI-1248-000991, filed with Document filed Jun. 30, 2023, "Specified Technologies Inc.'s Invalidity Contentions" in Case 1:22-cv-01248-CJB (in the U.S. District Court for the District of Delaware).
Document STI-1248-000992, filed with Document filed Jun. 30, 2023, "Specified Technologies Inc.'s Invalidity Contentions" in Case 1:22-cv-01248-CJB (in the U.S. District Court for the District of Delaware).
Document STI-1248-000993, filed with Document filed Jun. 30, 2023, "Specified Technologies Inc.'s Invalidity Contentions" in Case 1:22-cv-01248-CJB (in the U.S. District Court for the District of Delaware).
Document STI-1248-000994, filed with Document filed Jun. 30, 2023, "Specified Technologies Inc.'s Invalidity Contentions" in Case 1:22-cv-01248-CJB (in the U.S. District Court for the District of Delaware).
Document STI-1248-000996, filed with Document filed Jun. 30, 2023, "Specified Technologies Inc.'s Invalidity Contentions" in Case 1:22-cv-01248-CJB (in the U.S. District Court for the District of Delaware).
Document STI-1248-001038, filed with Document filed Jun. 30, 2023, "Specified Technologies Inc.'s Invalidity Contentions" in Case 1:22-cv-01248-CJB (in the U.S. District Court for the District of Delaware).
Document STI-1248-001039, filed with Document filed Jun. 30, 2023, "Specified Technologies Inc.'s Invalidity Contentions" in Case 1:22-cv-01248-CJB (in the U.S. District Court for the District of Delaware).
Document STI-1248-001091, filed with Document filed Jun. 30, 2023, "Specified Technologies Inc.'s Invalidity Contentions" in Case 1:22-cv-01248-CJB (in the U.S. District Court for the District of Delaware).
Document STI-1248-001701, filed with Document filed Jun. 30, 2023, "Specified Technologies Inc.'s Invalidity Contentions" in Case 1:22-cv-01248-CJB (in the U.S. District Court for the District of Delaware).
Document STI-1248-001702, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001703, filed with Document filed Jun. 30, 2023, "Specified Technologies Inc.'s Invalidity Contentions" in Case 1:22-cv-01248-CJB (in the U.S. District Court for the District of Delaware).
Document STI-1248-001704, filed with Document filed Jun. 30, 2023, "Specified Technologies Inc.'s Invalidity Contentions" in Case 1:22-cv-01248-CJB (in the U.S. District Court for the District of Delaware).
Document STI-1248-001705, filed with Document filed Jun. 30, 2023, "Specified Technologies Inc.'s Invalidity Contentions" in Case 1:22-cv-01248-CJB (in the U.S. District Court for the District of Delaware).
Document STI-1248-001805, filed with Document filed Jun. 30, 2023, "Specified Technologies Inc.'s Invalidity Contentions" in Case 1:22-cv-01248-CJB (in the U.S. District Court for the District of Delaware).
Document STI-1248-001806, filed with Document filed Jun. 30, 2023, "Specified Technologies Inc.'s Invalidity Contentions" in Case 1:22-cv-01248-CJB (in the U.S. District Court for the District of Delaware).
Document STI-1248-003725, filed with Document filed Jun. 30, 2023, "Specified Technologies Inc.'s Invalidity Contentions" in Case 1:22-cv-01248-CJB (in the U.S. District Court for the District of Delaware).
Document STI-1248-003736, filed with Document filed Jun. 30, 2023, "Specified Technologies Inc.'s Invalidity Contentions" in Case 1:22-cv-01248-CJB (in the U.S. District Court for the District of Delaware).
Document STI-1248-003737, filed with Document filed Jun. 30, 2023, "Specified Technologies Inc.'s Invalidity Contentions" in Case 1:22-cv-01248-CJB (in the U.S. District Court for the District of Delaware).
Document STI-1248-003738, filed with Document filed Jun. 30, 2023, "Specified Technologies Inc.'s Invalidity Contentions" in Case 1:22-cv-01248-CJB (in the U.S. District Court for the District of Delaware).
Document STI-1248-003739, filed with Document filed Jun. 30, 2023, "Specified Technologies Inc.'s Invalidity Contentions" in Case 1:22-cv-01248-CJB (in the U.S. District Court for the District of Delaware).
Document STI-1248-003766, filed with Document filed Jun. 30, 2023, "Specified Technologies Inc.'s Invalidity Contentions" in Case 1:22-cv-01248-CJB (in the U.S. District Court for the District of Delaware).
Document STI-1248-003767, filed with Document filed Jun. 30, 2023, "Specified Technologies Inc.'s Invalidity Contentions" in Case 1:22-cv-01248-CJB (in the U.S. District Court for the District of Delaware).
Document STI-1248-003768, filed with Document filed Jun. 30, 2023, "Specified Technologies Inc.'s Invalidity Contentions" in Case 1:22-cv-01248-CJB (in the U.S. District Court for the District of Delaware).
Document STI-1248-003769, filed with Document filed Jun. 30, 2023, "Specified Technologies Inc.'s Invalidity Contentions" in Case 1:22-cv-01248-CJB (in the U.S. District Court for the District of Delaware).
Document STI-1248-003770, filed with Document filed Jun. 30, 2023, "Specified Technologies Inc.'s Invalidity Contentions" in Case 1:22-cv-01248-CJB (in the U.S. District Court for the District of Delaware).
Document STI-1248-003771, filed with Document filed Jun. 30, 2023, "Specified Technologies Inc.'s Invalidity Contentions" in Case 1:22-cv-01248-CJB (in the U.S. District Court for the District of Delaware).
Document STI-1248-003772, filed with Document filed Jun. 30, 2023, "Specified Technologies Inc.'s Invalidity Contentions" in Case 1:22-cv-01248-CJB (in the U.S. District Court for the District of Delaware).
Document STI-1248-003773, filed with Document filed Jun. 30, 2023, "Specified Technologies Inc.'s Invalidity Contentions" in Case 1:22-cv-01248-CJB (in the U.S. District Court for the District of Delaware).
Document STI-1248-003774, filed with Document filed Jun. 30, 2023, "Specified Technologies Inc.'s Invalidity Contentions" in Case 1:22-cv-01248-CJB (in the U.S. District Court for the District of Delaware).
Document STI-1248-003775, filed with Document filed Jun. 30, 2023, "Specified Technologies Inc.'s Invalidity Contentions" in Case 1:22-cv-01248-CJB (in the U.S. District Court for the District of Delaware).
Document STI-1248-003776, filed with Document filed Jun. 30, 2023, "Specified Technologies Inc.'s Invalidity Contentions" in Case 1:22-cv-01248-CJB (in the U.S. District Court for the District of Delaware).
Document STI-1248-003777, filed with Document filed Jun. 30, 2023, "Specified Technologies Inc.'s Invalidity Contentions" in Case 1:22-cv-01248-CJB (in the U.S. District Court for the District of Delaware).
Document STI-1248-003778, filed with Document filed Jun. 30, 2023, "Specified Technologies Inc.'s Invalidity Contentions" in Case 1:22-cv-01248-CJB (in the U.S. District Court for the District of Delaware).
Document STI-1248-003779, filed with Document filed Jun. 30, 2023, "Specified Technologies Inc.'s Invalidity Contentions" in Case 1:22-cv-01248-CJB (in the U.S. District Court for the District of Delaware).
Document STI-1248-003780, filed with Document filed Jun. 30, 2023, "Specified Technologies Inc.'s Invalidity Contentions" in Case 1:22-cv-01248-CJB (in the U.S. District Court for the District of Delaware).
Document STI-1248-003781, filed with Document filed Jun. 30, 2023, "Specified Technologies Inc.'s Invalidity Contentions" in Case 1:22-cv-01248-CJB (in the U.S. District Court for the District of Delaware).
Document STI-1248-003782, filed with Document filed Jun. 30, 2023, "Specified Technologies Inc.'s Invalidity Contentions" in Case 1:22-cv-01248-CJB (in the U.S. District Court for the District of Delaware).
Document STI-1248-003783, filed with Document filed Jun. 30, 2023, "Specified Technologies Inc.'s Invalidity Contentions" in Case 1:22-cv-01248-CJB (in the U.S. District Court for the District of Delaware).
Document STI-1248-003787, filed with Document filed Jun. 30, 2023, "Specified Technologies Inc.'s Invalidity Contentions" in Case 1:22-cv-01248-CJB (in the U.S. District Court for the District of Delaware).
Document STI-1248-003791, filed with Document filed Jun. 30, 2023, "Specified Technologies Inc.'s Invalidity Contentions" in Case 1:22-cv-01248-CJB (in the U.S. District Court for the District of Delaware).
Document STI-1248-003792, filed with Document filed Jun. 30, 2023, "Specified Technologies Inc.'s Invalidity Contentions" in Case 1:22-cv-01248-CJB (in the U.S. District Court for the District of Delaware).
Document STI-1248-003806, filed with Document filed Jun. 30, 2023, "Specified Technologies Inc.'s Invalidity Contentions" in Case 1:22-cv-01248-CJB (in the U.S. District Court for the District of Delaware).
Document STI-1248-003808, filed with Document filed Jun. 30, 2023, "Specified Technologies Inc.'s Invalidity Contentions" in Case 1:22-cv-01248-CJB (in the U.S. District Court for the District of Delaware).
Document STI-1248-003812, filed with Document filed Jun. 30, 2023, "Specified Technologies Inc.'s Invalidity Contentions" in Case 1:22-cv-01248-CJB (in the U.S. District Court for the District of Delaware).
Document STI-1248-003816, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003820, filed with Document filed Jun. 30, 2023, "Specified Technologies Inc.'s Invalidity Contentions" in Case 1:22-cv-01248-CJB (in the U.S. District Court for the District of Delaware).
Document STI-1248-003824, filed with Document filed Jun. 30, 2023, "Specified Technologies Inc.'s Invalidity Contentions" in Case 1:22-cv-01248-CJB (in the U.S. District Court for the District of Delaware).
Document STI-1248-003827, filed with Document filed Jun. 30, 2023, "Specified Technologies Inc.'s Invalidity Contentions" in Case 1:22-cv-01248-CJB (in the U.S. District Court for the District of Delaware).
Document STI-1248-003828, filed with Document filed Jun. 30, 2023, "Specified Technologies Inc.'s Invalidity Contentions" in Case 1:22-cv-01248-CJB (in the U.S. District Court for the District of Delaware).
Document STI-1248-003829, filed with Document filed Jun. 30, 2023, "Specified Technologies Inc.'s Invalidity Contentions" in Case 1:22-cv-01248-CJB (in the U.S. District Court for the District of Delaware).
Document STI-1248-003830, filed with Document filed Jun. 30, 2023, "Specified Technologies Inc.'s Invalidity Contentions" in Case 1:22-cv-01248-CJB (in the U.S. District Court for the District of Delaware).
Document STI-1248-003837, filed with Document filed Jun. 30, 2023, "Specified Technologies Inc.'s Invalidity Contentions" in Case 1:22-cv-01248-CJB (in the U.S. District Court for the District of Delaware).
Document STI-1248-003838, filed with Document filed Jun. 30, 2023, "Specified Technologies Inc.'s Invalidity Contentions" in Case 1:22-cv-01248-CJB (in the U.S. District Court for the District of Delaware).
Document STI-1248-003839, filed with Document filed Jun. 30, 2023, "Specified Technologies Inc.'s Invalidity Contentions" in Case 1:22-cv-01248-CJB (in the U.S. District Court for the District of Delaware).
Document STI-1248-003840, filed with Document filed Jun. 30, 2023, "Specified Technologies Inc.'s Invalidity Contentions" in Case 1:22-cv-01248-CJB (in the U.S. District Court for the District of Delaware).
Document STI-1248-003841, filed with Document filed Jun. 30, 2023, "Specified Technologies Inc.'s Invalidity Contentions" in Case 1:22-cv-01248-CJB (in the U.S. District Court for the District of Delaware).
Document STI-1248-003842, filed with Document filed Jun. 30, 2023, "Specified Technologies Inc.'s Invalidity Contentions" in Case 1:22-cv-01248-CJB (in the U.S. District Court for the District of Delaware).
Document STI-1248-003843, filed with Document filed Jun. 30, 2023, "Specified Technologies Inc.'s Invalidity Contentions" in Case 1:22-cv-01248-CJB (in the U.S. District Court for the District of Delaware).
Document STI-1248-003844, filed with Document filed Jun. 30, 2023, "Specified Technologies Inc.'s Invalidity Contentions" in Case 1:22-cv-01248-CJB (in the U.S. District Court for the District of Delaware).
Document STI-1248-003845, filed with Document filed Jun. 30, 2023, "Specified Technologies Inc.'s Invalidity Contentions" in Case 1:22-cv-01248-CJB (in the U.S. District Court for the District of Delaware).
Document STI-1248-003847, filed with Document filed Jun. 30, 2023, "Specified Technologies Inc.'s Invalidity Contentions" in Case 1:22-cv-01248-CJB (in the U.S. District Court for the District of Delaware).
Document STI-1248-003848, filed with Document filed Jun. 30, 2023, "Specified Technologies Inc.'s Invalidity Contentions" in Case 1:22-cv-01248-CJB (in the U.S. District Court for the District of Delaware).
Document STI-1248-003849, filed with Document filed Jun. 30, 2023, "Specified Technologies Inc.'s Invalidity Contentions" in Case 1:22-cv-01248-CJB (in the U.S. District Court for the District of Delaware).
Document STI-1248-003850, filed with Document filed Jun. 30, 2023, "Specified Technologies Inc.'s Invalidity Contentions" in Case 1:22-cv-01248-CJB (in the U.S. District Court for the District of Delaware).
Document STI-1248-003851, filed with Document filed Jun. 30, 2023, "Specified Technologies Inc.'s Invalidity Contentions" in Case 1:22-cv-01248-CJB (in the U.S. District Court for the District of Delaware).
Document STI-1248-003855, filed with Document filed Jun. 30, 2023, "Specified Technologies Inc.'s Invalidity Contentions" in Case 1:22-cv-01248-CJB (in the U.S. District Court for the District of Delaware).
Document STI-1248-003856, filed with Document filed Jun. 30, 2023, "Specified Technologies Inc.'s Invalidity Contentions" in Case 1:22-cv-01248-CJB (in the U.S. District Court for the District of Delaware).
Document STI-1248-003857, filed with Document filed Jun. 30, 2023, "Specified Technologies Inc.'s Invalidity Contentions" in Case 1:22-cv-01248-CJB (in the U.S. District Court for the District of Delaware).
Document STI-1248-003859, filed with Document filed Jun. 30, 2023, "Specified Technologies Inc.'s Invalidity Contentions" in Case 1:22-cv-01248-CJB (in the U.S. District Court for the District of Delaware).
Document STI-1248-003892, filed with Document filed Jun. 30, 2023, "Specified Technologies Inc.'s Invalidity Contentions" in Case 1:22-cv-01248-CJB (in the U.S. District Court for the District of Delaware).
Document STI-1248-003903, filed with Document filed Jun. 30, 2023, "Specified Technologies Inc.'s Invalidity Contentions" in Case 1:22-cv-01248-CJB (in the U.S. District Court for the District of Delaware).
Document STI-1248-004139, filed with Document filed Jun. 30, 2023, "Specified Technologies Inc.'s Invalidity Contentions" in Case 1:22-cv-01248-CJB (in the U.S. District Court for the District of Delaware).
Document STI-1248-004140, filed with Document filed Jun. 30, 2023, "Specified Technologies Inc.'s Invalidity Contentions" in Case 1:22-cv-01248-CJB (in the U.S. District Court for the District of Delaware).
Document STI-1248-004141, filed with Document filed Jun. 30, 2023, "Specified Technologies Inc.'s Invalidity Contentions" in Case 1:22-cv-01248-CJB (in the U.S. District Court for the District of Delaware).
Document STI-1248-004146, filed with Document filed Jun. 30, 2023, "Specified Technologies Inc.'s Invalidity Contentions" in Case 1:22-cv-01248-CJB (in the U.S. District Court for the District of Delaware).
Document STI-1248-004160, filed with Document filed Jun. 30, 2023, "Specified Technologies Inc.'s Invalidity Contentions" in Case 1:22-cv-01248-CJB (in the U.S. District Court for the District of Delaware).
Document STI-1248-005457, filed with Document filed Jun. 30, 2023, "Specified Technologies Inc.'s Invalidity Contentions" in Case 1:22-cv-01248-CJB (in the U.S. District Court for the District of Delaware).
Document STI-1248-005458, filed with Document filed Jun. 30, 2023, "Specified Technologies Inc.'s Invalidity Contentions" in Case 1:22-cv-01248-CJB (in the U.S. District Court for the District of Delaware).
Document STI-1248-005459, filed with Document filed Jun. 30, 2023, "Specified Technologies Inc.'s Invalidity Contentions" in Case 1:22-cv-01248-CJB (in the U.S. District Court for the District of Delaware).
Document STI-1248-005460, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005461, filed with Document filed Jun. 30, 2023, "Specified Technologies Inc.'s Invalidity Contentions" in Case 1:22-cv-01248-CJB (in the U.S. District Court for the District of Delaware).
Document STI-1248-005462, filed with Document filed Jun. 30, 2023, "Specified Technologies Inc.'s Invalidity Contentions" in Case 1:22-cv-01248-CJB (in the U.S. District Court for the District of Delaware).
Document STI-1248-005463, filed with Document filed Jun. 30, 2023, "Specified Technologies Inc.'s Invalidity Contentions" in Case 1:22-cv-01248-CJB (in the U.S. District Court for the District of Delaware).
Document STI-1248-005485, filed with Document filed Jun. 30, 2023, "Specified Technologies Inc.'s Invalidity Contentions" in Case 1:22-cv-01248-CJB (in the U.S. District Court for the District of Delaware).
Document STI-1248-005487, filed with Document filed Jun. 30, 2023, "Specified Technologies Inc.'s Invalidity Contentions" in Case 1:22-cv-01248-CJB (in the U.S. District Court for the District of Delaware).
Document STI-1248-005488, filed with Document filed Jun. 30, 2023, "Specified Technologies Inc.'s Invalidity Contentions" in Case 1:22-cv-01248-CJB (in the U.S. District Court for the District of Delaware).
Document STI-1248-005489, filed with Document filed Jun. 30, 2023, "Specified Technologies Inc.'s Invalidity Contentions" in Case 1:22-cv-01248-CJB (in the U.S. District Court for the District of Delaware).
Document STI-1248-005491, filed with Document filed Jun. 30, 2023, "Specified Technologies Inc.'s Invalidity Contentions" in Case 1:22-cv-01248-CJB (in the U.S. District Court for the District of Delaware).
Document STI-1248-005492, filed with Document filed Jun. 30, 2023, "Specified Technologies Inc.'s Invalidity Contentions" in Case 1:22-cv-01248-CJB (in the U.S. District Court for the District of Delaware).
Document STI-1248-005493, filed with Document filed Jun. 30, 2023, "Specified Technologies Inc.'s Invalidity Contentions" in Case 1:22-cv-01248-CJB (in the U.S. District Court for the District of Delaware).
Document STI-1248-005494, filed with Document filed Jun. 30, 2023, "Specified Technologies Inc.'s Invalidity Contentions" in Case 1:22-cv-01248-CJB (in the U.S. District Court for the District of Delaware).
Document STI-1248-005523, filed with Document filed Jun. 30, 2023, "Specified Technologies Inc.'s Invalidity Contentions" in Case 1:22-cv-01248-CJB (in the U.S. District Court for the District of Delaware).
Document STI-1248-005524, filed with Document filed Jun. 30, 2023, "Specified Technologies Inc.'s Invalidity Contentions" in Case 1:22-cv-01248-CJB (in the U.S. District Court for the District of Delaware).
Document STI-1248-005525, filed with Document filed Jun. 30, 2023, "Specified Technologies Inc.'s Invalidity Contentions" in Case 1:22-cv-01248-CJB (in the U.S. District Court for the District of Delaware).
Document STI-1248-005526, filed with Document filed Jun. 30, 2023, "Specified Technologies Inc.'s Invalidity Contentions" in Case 1:22-cv-01248-CJB (in the U.S. District Court for the District of Delaware).
Document STI-1248-005527, filed with Document filed Jun. 30, 2023, "Specified Technologies Inc.'s Invalidity Contentions" in Case 1:22-cv-01248-CJB (in the U.S. District Court for the District of Delaware).
Document STI-1248-005528, filed with Document filed Jun. 30, 2023, "Specified Technologies Inc.'s Invalidity Contentions" in Case 1:22-cv-01248-CJB (in the U.S. District Court for the District of Delaware).
Document STI-1248-000050, filed with Document filed Jun. 30, 2023, "Specified Technologies Inc.'s Invalidity Contentions" in Case 1:22-cv-01248-CJB (in the U.S. District Court for the District of Delaware).
Document STI-1248-000072, filed with Document filed Jun. 30, 2023, "Specified Technologies Inc.'s Invalidity Contentions" in Case 1:22-cv-01248-CJB (in the U.S. District Court for the District of Delaware).
Document STI-1248-000853, filed with Document filed Jun. 30, 2023, "Specified Technologies Inc.'s Invalidity Contentions" in Case 1:22-cv-01248-CJB (in the U.S. District Court for the District of Delaware).
Document STI-1248-000854, filed with Document filed Jun. 30, 2023, "Specified Technologies Inc.'s Invalidity Contentions" in Case 1:22-cv-01248-CJB (in the U.S. District Court for the District of Delaware).
Document STI-1248-000855, filed with Document filed Jun. 30, 2023, "Specified Technologies Inc.'s Invalidity Contentions" in Case 1:22-cv-01248-CJB (in the U.S. District Court for the District of Delaware).
Document STI-1248-000863, filed with Document filed Jun. 30, 2023, "Specified Technologies Inc.'s Invalidity Contentions" in Case 1:22-cv-01248-CJB (in the U.S. District Court for the District of Delaware).
Document STI-1248-000937, filed with Document filed Jun. 30, 2023, "Specified Technologies Inc.'s Invalidity Contentions" in Case 1:22-cv-01248-CJB (in the U.S. District Court for the District of Delaware).
Document STI-1248-000973, filed with Document filed Jun. 30, 2023, "Specified Technologies Inc.'s Invalidity Contentions" in Case 1:22-cv-01248-CJB (in the U.S. District Court for the District of Delaware).
Document STI-1248-000976, filed with Document filed Jun. 30, 2023, "Specified Technologies Inc.'s Invalidity Contentions" in Case 1:22-cv-01248-CJB (in the U.S. District Court for the District of Delaware).
Document STI-1248-001000, filed with Document filed Jun. 30, 2023, "Specified Technologies Inc.'s Invalidity Contentions" in Case 1:22-cv-01248-CJB (in the U.S. District Court for the District of Delaware).
Document STI-1248-001001, filed with Document filed Jun. 30, 2023, "Specified Technologies Inc.'s Invalidity Contentions" in Case 1:22-cv-01248-CJB (in the U.S. District Court for the District of Delaware).
Document STI-1248-001070, filed with Document filed Jun. 30, 2023, "Specified Technologies Inc.'s Invalidity Contentions" in Case 1:22-cv-01248-CJB (in the U.S. District Court for the District of Delaware).
Document STI-1248-001084, filed with Document filed Jun. 30, 2023, "Specified Technologies Inc.'s Invalidity Contentions" in Case 1:22-cv-01248-CJB (in the U.S. District Court for the District of Delaware).
Document STI-1248-001086, filed with Document filed Jun. 30, 2023, "Specified Technologies Inc.'s Invalidity Contentions" in Case 1:22-cv-01248-CJB (in the U.S. District Court for the District of Delaware).
Document STI-1248-001107, filed with Document filed Jun. 30, 2023, "Specified Technologies Inc.'s Invalidity Contentions" in Case 1:22-cv-01248-CJB (in the U.S. District Court for the District of Delaware).
Document STI-1248-001670, filed with Document filed Jun. 30, 2023, "Specified Technologies Inc.'s Invalidity Contentions" in Case 1:22-cv-01248-CJB (in the U.S. District Court for the District of Delaware).
Document STI-1248-001671, filed with Document filed Jun. 30, 2023, "Specified Technologies Inc.'s Invalidity Contentions" in Case 1:22-cv-01248-CJB (in the U.S. District Court for the District of Delaware).
Document STI-1248-001672, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001673, filed with Document filed Jun. 30, 2023, "Specified Technologies Inc.'s Invalidity Contentions" in Case 1:22-cv-01248-CJB (in the U.S. District Court for the District of Delaware).
Document STI-1248-001674, filed with Document filed Jun. 30, 2023, "Specified Technologies Inc.'s Invalidity Contentions" in Case 1:22-cv-01248-CJB (in the U.S. District Court for the District of Delaware).
Document STI-1248-001675, filed with Document filed Jun. 30, 2023, "Specified Technologies Inc.'s Invalidity Contentions" in Case 1:22-cv-01248-CJB (in the U.S. District Court for the District of Delaware).
Document STI-1248-001676, filed with Document filed Jun. 30, 2023, "Specified Technologies Inc.'s Invalidity Contentions" in Case 1:22-cv-01248-CJB (in the U.S. District Court for the District of Delaware).
Document STI-1248-001677, filed with Document filed Jun. 30, 2023, "Specified Technologies Inc.'s Invalidity Contentions" in Case 1:22-cv-01248-CJB (in the U.S. District Court for the District of Delaware).
Document STI-1248-001678, filed with Document filed Jun. 30, 2023, "Specified Technologies Inc.'s Invalidity Contentions" in Case 1:22-cv-01248-CJB (in the U.S. District Court for the District of Delaware).
Document STI-1248-001679, filed with Document filed Jun. 30, 2023, "Specified Technologies Inc.'s Invalidity Contentions" in Case 1:22-cv-01248-CJB (in the U.S. District Court for the District of Delaware).
Document STI-1248-001680, filed with Document filed Jun. 30, 2023, "Specified Technologies Inc.'s Invalidity Contentions" in Case 1:22-cv-01248-CJB (in the U.S. District Court for the District of Delaware).
Document STI-1248-001681, filed with Document filed Jun. 30, 2023, "Specified Technologies Inc.'s Invalidity Contentions" in Case 1:22-cv-01248-CJB (in the U.S. District Court for the District of Delaware).
Document STI-1248-001682, filed with Document filed Jun. 30, 2023, "Specified Technologies Inc.'s Invalidity Contentions" in Case 1:22-cv-01248-CJB (in the U.S. District Court for the District of Delaware).
Document STI-1248-001683, filed with Document filed Jun. 30, 2023, "Specified Technologies Inc.'s Invalidity Contentions" in Case 1:22-cv-01248-CJB (in the U.S. District Court for the District of Delaware).
Document STI-1248-001684, filed with Document filed Jun. 30, 2023, "Specified Technologies Inc.'s Invalidity Contentions" in Case 1:22-cv-01248-CJB (in the U.S. District Court for the District of Delaware).
Document STI-1248-001685, filed with Document filed Jun. 30, 2023, "Specified Technologies Inc.'s Invalidity Contentions" in Case 1:22-cv-01248-CJB (in the U.S. District Court for the District of Delaware).
Document STI-1248-001686, filed with Document filed Jun. 30, 2023, "Specified Technologies Inc.'s Invalidity Contentions" in Case 1:22-cv-01248-CJB (in the U.S. District Court for the District of Delaware).
Document STI-1248-001687, filed with Document filed Jun. 30, 2023, "Specified Technologies Inc.'s Invalidity Contentions" in Case 1:22-cv-01248-CJB (in the U.S. District Court for the District of Delaware).
Document STI-1248-001688, filed with Document filed Jun. 30, 2023, "Specified Technologies Inc.'s Invalidity Contentions" in Case 1:22-cv-01248-CJB (in the U.S. District Court for the District of Delaware).
Document STI-1248-001689, filed with Document filed Jun. 30, 2023, "Specified Technologies Inc.'s Invalidity Contentions" in Case 1:22-cv-01248-CJB (in the U.S. District Court for the District of Delaware).
Document STI-1248-001690, filed with Document filed Jun. 30, 2023, "Specified Technologies Inc.'s Invalidity Contentions" in Case 1:22-cv-01248-CJB (in the U.S. District Court for the District of Delaware).
Document STI-1248-001691, filed with Document filed Jun. 30, 2023, "Specified Technologies Inc.'s Invalidity Contentions" in Case 1:22-cv-01248-CJB (in the U.S. District Court for the District of Delaware).
Document STI-1248-001692, filed with Document filed Jun. 30, 2023, "Specified Technologies Inc.'s Invalidity Contentions" in Case 1:22-cv-01248-CJB (in the U.S. District Court for the District of Delaware).
Document STI-1248-001693, filed with Document filed Jun. 30, 2023, "Specified Technologies Inc.'s Invalidity Contentions" in Case 1:22-cv-01248-CJB (in the U.S. District Court for the District of Delaware).
Document STI-1248-001694, filed with Document filed Jun. 30, 2023, "Specified Technologies Inc.'s Invalidity Contentions" in Case 1:22-cv-01248-CJB (in the U.S. District Court for the District of Delaware).
Document STI-1248-001695, filed with Document filed Jun. 30, 2023, "Specified Technologies Inc.'s Invalidity Contentions" in Case 1:22-cv-01248-CJB (in the U.S. District Court for the District of Delaware).
Document STI-1248-001696, filed with Document filed Jun. 30, 2023, "Specified Technologies Inc.'s Invalidity Contentions" in Case 1:22-cv-01248-CJB (in the U.S. District Court for the District of Delaware).
Document STI-1248-001697, filed with Document filed Jun. 30, 2023, "Specified Technologies Inc.'s Invalidity Contentions" in Case 1:22-cv-01248-CJB (in the U.S. District Court for the District of Delaware).
Document STI-1248-001698, filed with Document filed Jun. 30, 2023, "Specified Technologies Inc.'s Invalidity Contentions" in Case 1:22-cv-01248-CJB (in the U.S. District Court for the District of Delaware).
Document STI-1248-001699, filed with Document filed Jun. 30, 2023, "Specified Technologies Inc.'s Invalidity Contentions" in Case 1:22-cv-01248-CJB (in the U.S. District Court for the District of Delaware).
Document STI-1248-001700, filed with Document filed Jun. 30, 2023, "Specified Technologies Inc.'s Invalidity Contentions" in Case 1:22-cv-01248-CJB (in the U.S. District Court for the District of Delaware).
Document STI-1248-001706, filed with Document filed Jun. 30, 2023, "Specified Technologies Inc.'s Invalidity Contentions" in Case 1:22-cv-01248-CJB (in the U.S. District Court for the District of Delaware).
Document STI-1248-001707, filed with Document filed Jun. 30, 2023, "Specified Technologies Inc.'s Invalidity Contentions" in Case 1:22-cv-01248-CJB (in the U.S. District Court for the District of Delaware).
Document STI-1248-001708, filed with Document filed Jun. 30, 2023, "Specified Technologies Inc.'s Invalidity Contentions" in Case 1:22-cv-01248-CJB (in the U.S. District Court for the District of Delaware).
Document STI-1248-001709, filed with Document filed Jun. 30, 2023, "Specified Technologies Inc.'s Invalidity Contentions" in Case 1:22-cv-01248-CJB (in the U.S. District Court for the District of Delaware).
Document STI-1248-001710, filed with Document filed Jun. 30, 2023, "Specified Technologies Inc.'s Invalidity Contentions" in Case 1:22-cv-01248-CJB (in the U.S. District Court for the District of Delaware).
Document STI-1248-001711, filed with Document filed Jun. 30, 2023, "Specified Technologies Inc.'s Invalidity Contentions" in Case 1:22-cv-01248-CJB (in the U.S. District Court for the District of Delaware).
Document STI-1248-001712, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001713, filed with Document filed Jun. 30, 2023, "Specified Technologies Inc.'s Invalidity Contentions" in Case 1:22-cv-01248-CJB (in the U.S. District Court for the District of Delaware).
Document STI-1248-001714, filed with Document filed Jun. 30, 2023, "Specified Technologies Inc.'s Invalidity Contentions" in Case 1:22-cv-01248-CJB (in the U.S. District Court for the District of Delaware).
Document STI-1248-001715, filed with Document filed Jun. 30, 2023, "Specified Technologies Inc.'s Invalidity Contentions" in Case 1:22-cv-01248-CJB (in the U.S. District Court for the District of Delaware).
Document STI-1248-001716, filed with Document filed Jun. 30, 2023, "Specified Technologies Inc.'s Invalidity Contentions" in Case 1:22-cv-01248-CJB (in the U.S. District Court for the District of Delaware).
Document STI-1248-001717, filed with Document filed Jun. 30, 2023, "Specified Technologies Inc.'s Invalidity Contentions" in Case 1:22-cv-01248-CJB (in the U.S. District Court for the District of Delaware).
Document STI-1248-001718, filed with Document filed Jun. 30, 2023, "Specified Technologies Inc.'s Invalidity Contentions" in Case 1:22-cv-01248-CJB (in the U.S. District Court for the District of Delaware).
Document STI-1248-001719, filed with Document filed Jun. 30, 2023, "Specified Technologies Inc.'s Invalidity Contentions" in Case 1:22-cv-01248-CJB (in the U.S. District Court for the District of Delaware).
Document STI-1248-001720, filed with Document filed Jun. 30, 2023, "Specified Technologies Inc.'s Invalidity Contentions" in Case 1:22-cv-01248-CJB (in the U.S. District Court for the District of Delaware).
Document STI-1248-001722, filed with Document filed Jun. 30, 2023, "Specified Technologies Inc.'s Invalidity Contentions" in Case 1:22-cv-01248-CJB (in the U.S. District Court for the District of Delaware).
Document STI-1248-001723, filed with Document filed Jun. 30, 2023, "Specified Technologies Inc.'s Invalidity Contentions" in Case 1:22-cv-01248-CJB (in the U.S. District Court for the District of Delaware).
Document STI-1248-001724, filed with Document filed Jun. 30, 2023, "Specified Technologies Inc.'s Invalidity Contentions" in Case 1:22-cv-01248-CJB (in the U.S. District Court for the District of Delaware).
Document STI-1248-001725, filed with Document filed Jun. 30, 2023, "Specified Technologies Inc.'s Invalidity Contentions" in Case 1:22-cv-01248-CJB (in the U.S. District Court for the District of Delaware).
Document STI-1248-001726, filed with Document filed Jun. 30, 2023, "Specified Technologies Inc.'s Invalidity Contentions" in Case 1:22-cv-01248-CJB (in the U.S. District Court for the District of Delaware).
Document STI-1248-001727, filed with Document filed Jun. 30, 2023, "Specified Technologies Inc.'s Invalidity Contentions" in Case 1:22-cv-01248-CJB (in the U.S. District Court for the District of Delaware).
Document STI-1248-001728, filed with Document filed Jun. 30, 2023, "Specified Technologies Inc.'s Invalidity Contentions" in Case 1:22-cv-01248-CJB (in the U.S. District Court for the District of Delaware).
Document STI-1248-001729, filed with Document filed Jun. 30, 2023, "Specified Technologies Inc.'s Invalidity Contentions" in Case 1:22-cv-01248-CJB (in the U.S. District Court for the District of Delaware).
Document STI-1248-001730, filed with Document filed Jun. 30, 2023, "Specified Technologies Inc.'s Invalidity Contentions" in Case 1:22-cv-01248-CJB (in the U.S. District Court for the District of Delaware).
Document STI-1248-001731, filed with Document filed Jun. 30, 2023, "Specified Technologies Inc.'s Invalidity Contentions" in Case 1:22-cv-01248-CJB (in the U.S. District Court for the District of Delaware).
Document STI-1248-001732, filed with Document filed Jun. 30, 2023, "Specified Technologies Inc.'s Invalidity Contentions" in Case 1:22-cv-01248-CJB (in the U.S. District Court for the District of Delaware).
Document STI-1248-001733, filed with Document filed Jun. 30, 2023, "Specified Technologies Inc.'s Invalidity Contentions" in Case 1:22-cv-01248-CJB (in the U.S. District Court for the District of Delaware).
Document STI-1248-001734, filed with Document filed Jun. 30, 2023, "Specified Technologies Inc.'s Invalidity Contentions" in Case 1:22-cv-01248-CJB (in the U.S. District Court for the District of Delaware).
Document STI-1248-001735, filed with Document filed Jun. 30, 2023, "Specified Technologies Inc.'s Invalidity Contentions" in Case 1:22-cv-01248-CJB (in the U.S. District Court for the District of Delaware).
Document STI-1248-001736, filed with Document filed Jun. 30, 2023, "Specified Technologies Inc.'s Invalidity Contentions" in Case 1:22-cv-01248-CJB (in the U.S. District Court for the District of Delaware).
Document STI-1248-001737, filed with Document filed Jun. 30, 2023, "Specified Technologies Inc.'s Invalidity Contentions" in Case 1:22-cv-01248-CJB (in the U.S. District Court for the District of Delaware).
Document STI-1248-001738, filed with Document filed Jun. 30, 2023, "Specified Technologies Inc.'s Invalidity Contentions" in Case 1:22-cv-01248-CJB (in the U.S. District Court for the District of Delaware).
Document STI-1248-001739, filed with Document filed Jun. 30, 2023, "Specified Technologies Inc.'s Invalidity Contentions" in Case 1:22-cv-01248-CJB (in the U.S. District Court for the District of Delaware).
Document STI-1248-001740, filed with Document filed Jun. 30, 2023, "Specified Technologies Inc.'s Invalidity Contentions" in Case 1:22-cv-01248-CJB (in the U.S. District Court for the District of Delaware).
Document STI-1248-001741, filed with Document filed Jun. 30, 2023, "Specified Technologies Inc.'s Invalidity Contentions" in Case 1:22-cv-01248-CJB (in the U.S. District Court for the District of Delaware).
Document STI-1248-001742, filed with Document filed Jun. 30, 2023, "Specified Technologies Inc.'s Invalidity Contentions" in Case 1:22-cv-01248-CJB (in the U.S. District Court for the District of Delaware).
Document STI-1248-001743, filed with Document filed Jun. 30, 2023, "Specified Technologies Inc.'s Invalidity Contentions" in Case 1:22-cv-01248-CJB (in the U.S. District Court for the District of Delaware).
Document STI-1248-001744, filed with Document filed Jun. 30, 2023, "Specified Technologies Inc.'s Invalidity Contentions" in Case 1:22-cv-01248-CJB (in the U.S. District Court for the District of Delaware).
Document STI-1248-001745, filed with Document filed Jun. 30, 2023, "Specified Technologies Inc.'s Invalidity Contentions" in Case 1:22-cv-01248-CJB (in the U.S. District Court for the District of Delaware).
Document STI-1248-001746, filed with Document filed Jun. 30, 2023, "Specified Technologies Inc.'s Invalidity Contentions" in Case 1:22-cv-01248-CJB (in the U.S. District Court for the District of Delaware).
Document STI-1248-001747, filed with Document filed Jun. 30, 2023, "Specified Technologies Inc.'s Invalidity Contentions" in Case 1:22-cv-01248-CJB (in the U.S. District Court for the District of Delaware).
Document STI-1248-001748, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001749, filed with Document filed Jun. 30, 2023, "Specified Technologies Inc.'s Invalidity Contentions" in Case 1:22-cv-01248-CJB (in the U.S. District Court for the District of Delaware).
Document STI-1248-001750, filed with Document filed Jun. 30, 2023, "Specified Technologies Inc.'s Invalidity Contentions" in Case 1:22-cv-01248-CJB (in the U.S. District Court for the District of Delaware).
Document STI-1248-001751, filed with Document filed Jun. 30, 2023, "Specified Technologies Inc.'s Invalidity Contentions" in Case 1:22-cv-01248-CJB (in the U.S. District Court for the District of Delaware).
Document STI-1248-001752, filed with Document filed Jun. 30, 2023, "Specified Technologies Inc.'s Invalidity Contentions" in Case 1:22-cv-01248-CJB (in the U.S. District Court for the District of Delaware).
Document STI-1248-001753, filed with Document filed Jun. 30, 2023, "Specified Technologies Inc.'s Invalidity Contentions" in Case 1:22-cv-01248-CJB (in the U.S. District Court for the District of Delaware).
Document STI-1248-001754, filed with Document filed Jun. 30, 2023, "Specified Technologies Inc.'s Invalidity Contentions" in Case 1:22-cv-01248-CJB (in the U.S. District Court for the District of Delaware).
Document STI-1248-001755, filed with Document filed Jun. 30, 2023, "Specified Technologies Inc.'s Invalidity Contentions" in Case 1:22-cv-01248-CJB (in the U.S. District Court for the District of Delaware).
Document STI-1248-001756, filed with Document filed Jun. 30, 2023, "Specified Technologies Inc.'s Invalidity Contentions" in Case 1:22-cv-01248-CJB (in the U.S. District Court for the District of Delaware).
Document STI-1248-001757, filed with Document filed Jun. 30, 2023, "Specified Technologies Inc.'s Invalidity Contentions" in Case 1:22-cv-01248-CJB (in the U.S. District Court for the District of Delaware).
Document STI-1248-001758, filed with Document filed Jun. 30, 2023, "Specified Technologies Inc.'s Invalidity Contentions" in Case 1:22-cv-01248-CJB (in the U.S. District Court for the District of Delaware).
Document STI-1248-001759, filed with Document filed Jun. 30, 2023, "Specified Technologies Inc.'s Invalidity Contentions" in Case 1:22-cv-01248-CJB (in the U.S. District Court for the District of Delaware).
Document STI-1248-001760, filed with Document filed Jun. 30, 2023, "Specified Technologies Inc.'s Invalidity Contentions" in Case 1:22-cv-01248-CJB (in the U.S. District Court for the District of Delaware).
Document STI-1248-001761, filed with Document filed Jun. 30, 2023, "Specified Technologies Inc.'s Invalidity Contentions" in Case 1:22-cv-01248-CJB (in the U.S. District Court for the District of Delaware).
Document STI-1248-001762, filed with Document filed Jun. 30, 2023, "Specified Technologies Inc.'s Invalidity Contentions" in Case 1:22-cv-01248-CJB (in the U.S. District Court for the District of Delaware).
Document STI-1248-001763, filed with Document filed Jun. 30, 2023, "Specified Technologies Inc.'s Invalidity Contentions" in Case 1:22-cv-01248-CJB (in the U.S. District Court for the District of Delaware).
Document STI-1248-001764, filed with Document filed Jun. 30, 2023, "Specified Technologies Inc.'s Invalidity Contentions" in Case 1:22-cv-01248-CJB (in the U.S. District Court for the District of Delaware).
Document STI-1248-001765, filed with Document filed Jun. 30, 2023, "Specified Technologies Inc.'s Invalidity Contentions" in Case 1:22-cv-01248-CJB (in the U.S. District Court for the District of Delaware).
Document STI-1248-001766, filed with Document filed Jun. 30, 2023, "Specified Technologies Inc.'s Invalidity Contentions" in Case 1:22-cv-01248-CJB (in the U.S. District Court for the District of Delaware).
Document STI-1248-001767, filed with Document filed Jun. 30, 2023, "Specified Technologies Inc.'s Invalidity Contentions" in Case 1:22-cv-01248-CJB (in the U.S. District Court for the District of Delaware).
Document STI-1248-001768, filed with Document filed Jun. 30, 2023, "Specified Technologies Inc.'s Invalidity Contentions" in Case 1:22-cv-01248-CJB (in the U.S. District Court for the District of Delaware).
Document STI-1248-001769, filed with Document filed Jun. 30, 2023, "Specified Technologies Inc.'s Invalidity Contentions" in Case 1:22-cv-01248-CJB (in the U.S. District Court for the District of Delaware).
Document STI-1248-001770, filed with Document filed Jun. 30, 2023, "Specified Technologies Inc.'s Invalidity Contentions" in Case 1:22-cv-01248-CJB (in the U.S. District Court for the District of Delaware).
Document STI-1248-001771, filed with Document filed Jun. 30, 2023, "Specified Technologies Inc.'s Invalidity Contentions" in Case 1:22-cv-01248-CJB (in the U.S. District Court for the District of Delaware).
Document STI-1248-001772, filed with Document filed Jun. 30, 2023, "Specified Technologies Inc.'s Invalidity Contentions" in Case 1:22-cv-01248-CJB (in the U.S. District Court for the District of Delaware).
Document STI-1248-001773, filed with Document filed Jun. 30, 2023, "Specified Technologies Inc.'s Invalidity Contentions" in Case 1:22-cv-01248-CJB (in the U.S. District Court for the District of Delaware).
Document STI-1248-001774, filed with Document filed Jun. 30, 2023, "Specified Technologies Inc.'s Invalidity Contentions" in Case 1:22-cv-01248-CJB (in the U.S. District Court for the District of Delaware).
Document STI-1248-001775, filed with Document filed Jun. 30, 2023, "Specified Technologies Inc.'s Invalidity Contentions" in Case 1:22-cv-01248-CJB (in the U.S. District Court for the District of Delaware).
Document STI-1248-001776, filed with Document filed Jun. 30, 2023, "Specified Technologies Inc.'s Invalidity Contentions" in Case 1:22-cv-01248-CJB (in the U.S. District Court for the District of Delaware).
Document STI-1248-001777, filed with Document filed Jun. 30, 2023, "Specified Technologies Inc.'s Invalidity Contentions" in Case 1:22-cv-01248-CJB (in the U.S. District Court for the District of Delaware).
Document STI-1248-001778, filed with Document filed Jun. 30, 2023, "Specified Technologies Inc.'s Invalidity Contentions" in Case 1:22-cv-01248-CJB (in the U.S. District Court for the District of Delaware).
Document STI-1248-001783, filed with Document filed Jun. 30, 2023, "Specified Technologies Inc.'s Invalidity Contentions" in Case 1:22-cv-01248-CJB (in the U.S. District Court for the District of Delaware).
Document STI-1248-001784, filed with Document filed Jun. 30, 2023, "Specified Technologies Inc.'s Invalidity Contentions" in Case 1:22-cv-01248-CJB (in the U.S. District Court for the District of Delaware).
Document STI-1248-001785, filed with Document filed Jun. 30, 2023, "Specified Technologies Inc.'s Invalidity Contentions" in Case 1:22-cv-01248-CJB (in the U.S. District Court for the District of Delaware).
Document STI-1248-001786, filed with Document filed Jun. 30, 2023, "Specified Technologies Inc.'s Invalidity Contentions" in Case 1:22-cv-01248-CJB (in the U.S. District Court for the District of Delaware).
Document STI-1248-001787, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001788, filed with Document filed Jun. 30, 2023, "Specified Technologies Inc.'s Invalidity Contentions" in Case 1:22-cv-01248-CJB (in the U.S. District Court for the District of Delaware).
Document STI-1248-001789, filed with Document filed Jun. 30, 2023, "Specified Technologies Inc.'s Invalidity Contentions" in Case 1:22-cv-01248-CJB (in the U.S. District Court for the District of Delaware).
Document STI-1248-001790, filed with Document filed Jun. 30, 2023, "Specified Technologies Inc.'s Invalidity Contentions" in Case 1:22-cv-01248-CJB (in the U.S. District Court for the District of Delaware).
Document STI-1248-001791, filed with Document filed Jun. 30, 2023, "Specified Technologies Inc.'s Invalidity Contentions" in Case 1:22-cv-01248-CJB (in the U.S. District Court for the District of Delaware).
Document STI-1248-001792, filed with Document filed Jun. 30, 2023, "Specified Technologies Inc.'s Invalidity Contentions" in Case 1:22-cv-01248-CJB (in the U.S. District Court for the District of Delaware).
Document STI-1248-001793, filed with Document filed Jun. 30, 2023, "Specified Technologies Inc.'s Invalidity Contentions" in Case 1:22-cv-01248-CJB (in the U.S. District Court for the District of Delaware).
Document STI-1248-001794, filed with Document filed Jun. 30, 2023, "Specified Technologies Inc.'s Invalidity Contentions" in Case 1:22-cv-01248-CJB (in the U.S. District Court for the District of Delaware).
Document STI-1248-001795, filed with Document filed Jun. 30, 2023, "Specified Technologies Inc.'s Invalidity Contentions" in Case 1:22-cv-01248-CJB (in the U.S. District Court for the District of Delaware).
Document STI-1248-001796, filed with Document filed Jun. 30, 2023, "Specified Technologies Inc.'s Invalidity Contentions" in Case 1:22-cv-01248-CJB (in the U.S. District Court for the District of Delaware).
Document STI-1248-001797, filed with Document filed Jun. 30, 2023, "Specified Technologies Inc.'s Invalidity Contentions" in Case 1:22-cv-01248-CJB (in the U.S. District Court for the District of Delaware).
Document STI-1248-001801, filed with Document filed Jun. 30, 2023, "Specified Technologies Inc.'s Invalidity Contentions" in Case 1:22-cv-01248-CJB (in the U.S. District Court for the District of Delaware).
Document STI-1248-001807, filed with Document filed Jun. 30, 2023, "Specified Technologies Inc.'s Invalidity Contentions" in Case 1:22-cv-01248-CJB (in the U.S. District Court for the District of Delaware).
Document STI-1248-001808, filed with Document filed Jun. 30, 2023, "Specified Technologies Inc.'s Invalidity Contentions" in Case 1:22-cv-01248-CJB (in the U.S. District Court for the District of Delaware).
Document STI-1248-001809, filed with Document filed Jun. 30, 2023, "Specified Technologies Inc.'s Invalidity Contentions" in Case 1:22-cv-01248-CJB (in the U.S. District Court for the District of Delaware).
Document STI-1248-001810, filed with Document filed Jun. 30, 2023, "Specified Technologies Inc.'s Invalidity Contentions" in Case 1:22-cv-01248-CJB (in the U.S. District Court for the District of Delaware).
Document STI-1248-001811, filed with Document filed Jun. 30, 2023, "Specified Technologies Inc.'s Invalidity Contentions" in Case 1:22-cv-01248-CJB (in the U.S. District Court for the District of Delaware).
Document STI-1248-001812, filed with Document filed Jun. 30, 2023, "Specified Technologies Inc.'s Invalidity Contentions" in Case 1:22-cv-01248-CJB (in the U.S. District Court for the District of Delaware).
Document STI-1248-001813, filed with Document filed Jun. 30, 2023, "Specified Technologies Inc.'s Invalidity Contentions" in Case 1:22-cv-01248-CJB (in the U.S. District Court for the District of Delaware).
Document STI-1248-001814, filed with Document filed Jun. 30, 2023, "Specified Technologies Inc.'s Invalidity Contentions" in Case 1:22-cv-01248-CJB (in the U.S. District Court for the District of Delaware).
Document STI-1248-001815, filed with Document filed Jun. 30, 2023, "Specified Technologies Inc.'s Invalidity Contentions" in Case 1:22-cv-01248-CJB (in the U.S. District Court for the District of Delaware).
Document STI-1248-001816, filed with Document filed Jun. 30, 2023, "Specified Technologies Inc.'s Invalidity Contentions" in Case 1:22-cv-01248-CJB (in the U.S. District Court for the District of Delaware).
Document STI-1248-001817, filed with Document filed Jun. 30, 2023, "Specified Technologies Inc.'s Invalidity Contentions" in Case 1:22-cv-01248-CJB (in the U.S. District Court for the District of Delaware).
Document STI-1248-001818, filed with Document filed Jun. 30, 2023, "Specified Technologies Inc.'s Invalidity Contentions" in Case 1:22-cv-01248-CJB (in the U.S. District Court for the District of Delaware).
Document STI-1248-001819, filed with Document filed Jun. 30, 2023, "Specified Technologies Inc.'s Invalidity Contentions" in Case 1:22-cv-01248-CJB (in the U.S. District Court for the District of Delaware).
Document STI-1248-001820, filed with Document filed Jun. 30, 2023, "Specified Technologies Inc.'s Invalidity Contentions" in Case 1:22-cv-01248-CJB (in the U.S. District Court for the District of Delaware).
Document STI-1248-001821, filed with Document filed Jun. 30, 2023, "Specified Technologies Inc.'s Invalidity Contentions" in Case 1:22-cv-01248-CJB (in the U.S. District Court for the District of Delaware).
Document STI-1248-001822, filed with Document filed Jun. 30, 2023, "Specified Technologies Inc.'s Invalidity Contentions" in Case 1:22-cv-01248-CJB (in the U.S. District Court for the District of Delaware).
Document STI-1248-001823, filed with Document filed Jun. 30, 2023, "Specified Technologies Inc.'s Invalidity Contentions" in Case 1:22-cv-01248-CJB (in the U.S. District Court for the District of Delaware).
Document STI-1248-001825, filed with Document filed Jun. 30, 2023, "Specified Technologies Inc.'s Invalidity Contentions" in Case 1:22-cv-01248-CJB (in the U.S. District Court for the District of Delaware).
Document STI-1248-001826, filed with Document filed Jun. 30, 2023, "Specified Technologies Inc.'s Invalidity Contentions" in Case 1:22-cv-01248-CJB (in the U.S. District Court for the District of Delaware).
Document STI-1248-001827, filed with Document filed Jun. 30, 2023, "Specified Technologies Inc.'s Invalidity Contentions" in Case 1:22-cv-01248-CJB (in the U.S. District Court for the District of Delaware).
Document STI-1248-001828, filed with Document filed Jun. 30, 2023, "Specified Technologies Inc.'s Invalidity Contentions" in Case 1:22-cv-01248-CJB (in the U.S. District Court for the District of Delaware).
Document STI-1248-001829, filed with Document filed Jun. 30, 2023, "Specified Technologies Inc.'s Invalidity Contentions" in Case 1:22-cv-01248-CJB (in the U.S. District Court for the District of Delaware).
Document STI-1248-001830, filed with Document filed Jun. 30, 2023, "Specified Technologies Inc.'s Invalidity Contentions" in Case 1:22-cv-01248-CJB (in the U.S. District Court for the District of Delaware).
Document STI-1248-001831, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001832, filed with Document filed Jun. 30, 2023, "Specified Technologies Inc.'s Invalidity Contentions" in Case 1:22-cv-01248-CJB (in the U.S. District Court for the District of Delaware).
Document STI-1248-001833, filed with Document filed Jun. 30, 2023, "Specified Technologies Inc.'s Invalidity Contentions" in Case 1:22-cv-01248-CJB (in the U.S. District Court for the District of Delaware).
Document STI-1248-001834, filed with Document filed Jun. 30, 2023, "Specified Technologies Inc.'s Invalidity Contentions" in Case 1:22-cv-01248-CJB (in the U.S. District Court for the District of Delaware).
Document STI-1248-001835, filed with Document filed Jun. 30, 2023, "Specified Technologies Inc.'s Invalidity Contentions" in Case 1:22-cv-01248-CJB (in the U.S. District Court for the District of Delaware).
Document STI-1248-001836, filed with Document filed Jun. 30, 2023, "Specified Technologies Inc.'s Invalidity Contentions" in Case 1:22-cv-01248-CJB (in the U.S. District Court for the District of Delaware).
Document STI-1248-001837, filed with Document filed Jun. 30, 2023, "Specified Technologies Inc.'s Invalidity Contentions" in Case 1:22-cv-01248-CJB (in the U.S. District Court for the District of Delaware).
Document STI-1248-001838, filed with Document filed Jun. 30, 2023, "Specified Technologies Inc.'s Invalidity Contentions" in Case 1:22-cv-01248-CJB (in the U.S. District Court for the District of Delaware).
Document STI-1248-001839, filed with Document filed Jun. 30, 2023, "Specified Technologies Inc.'s Invalidity Contentions" in Case 1:22-cv-01248-CJB (in the U.S. District Court for the District of Delaware).
Document STI-1248-001840, filed with Document filed Jun. 30, 2023, "Specified Technologies Inc.'s Invalidity Contentions" in Case 1:22-cv-01248-CJB (in the U.S. District Court for the District of Delaware).
Document STI-1248-001841, filed with Document filed Jun. 30, 2023, "Specified Technologies Inc.'s Invalidity Contentions" in Case 1:22-cv-01248-CJB (in the U.S. District Court for the District of Delaware).
Document STI-1248-001842, filed with Document filed Jun. 30, 2023, "Specified Technologies Inc.'s Invalidity Contentions" in Case 1:22-cv-01248-CJB (in the U.S. District Court for the District of Delaware).
Document STI-1248-001843, filed with Document filed Jun. 30, 2023, "Specified Technologies Inc.'s Invalidity Contentions" in Case 1:22-cv-01248-CJB (in the U.S. District Court for the District of Delaware).
Document STI-1248-001844, filed with Document filed Jun. 30, 2023, "Specified Technologies Inc.'s Invalidity Contentions" in Case 1:22-cv-01248-CJB (in the U.S. District Court for the District of Delaware).
Document STI-1248-001845, filed with Document filed Jun. 30, 2023, "Specified Technologies Inc.'s Invalidity Contentions" in Case 1:22-cv-01248-CJB (in the U.S. District Court for the District of Delaware).
Document STI-1248-001846, filed with Document filed Jun. 30, 2023, "Specified Technologies Inc.'s Invalidity Contentions" in Case 1:22-cv-01248-CJB (in the U.S. District Court for the District of Delaware).
Document STI-1248-001847, filed with Document filed Jun. 30, 2023, "Specified Technologies Inc.'s Invalidity Contentions" in Case 1:22-cv-01248-CJB (in the U.S. District Court for the District of Delaware).
Document STI-1248-001848, filed with Document filed Jun. 30, 2023, "Specified Technologies Inc.'s Invalidity Contentions" in Case 1:22-cv-01248-CJB (in the U.S. District Court for the District of Delaware).
Document STI-1248-001849, filed with Document filed Jun. 30, 2023, "Specified Technologies Inc.'s Invalidity Contentions" in Case 1:22-cv-01248-CJB (in the U.S. District Court for the District of Delaware).
Document STI-1248-001850, filed with Document filed Jun. 30, 2023, "Specified Technologies Inc.'s Invalidity Contentions" in Case 1:22-cv-01248-CJB (in the U.S. District Court for the District of Delaware).
Document STI-1248-001851, filed with Document filed Jun. 30, 2023, "Specified Technologies Inc.'s Invalidity Contentions" in Case 1:22-cv-01248-CJB (in the U.S. District Court for the District of Delaware).
Document STI-1248-001852, filed with Document filed Jun. 30, 2023, "Specified Technologies Inc.'s Invalidity Contentions" in Case 1:22-cv-01248-CJB (in the U.S. District Court for the District of Delaware).
Document STI-1248-001853, filed with Document filed Jun. 30, 2023, "Specified Technologies Inc.'s Invalidity Contentions" in Case 1:22-cv-01248-CJB (in the U.S. District Court for the District of Delaware).
Document STI-1248-001854, filed with Document filed Jun. 30, 2023, "Specified Technologies Inc.'s Invalidity Contentions" in Case 1:22-cv-01248-CJB (in the U.S. District Court for the District of Delaware).
Document STI-1248-001855, filed with Document filed Jun. 30, 2023, "Specified Technologies Inc.'s Invalidity Contentions" in Case 1:22-cv-01248-CJB (in the U.S. District Court for the District of Delaware).
Document STI-1248-001856, filed with Document filed Jun. 30, 2023, "Specified Technologies Inc.'s Invalidity Contentions" in Case 1:22-cv-01248-CJB (in the U.S. District Court for the District of Delaware).
Document STI-1248-001857, filed with Document filed Jun. 30, 2023, "Specified Technologies Inc.'s Invalidity Contentions" in Case 1:22-cv-01248-CJB (in the U.S. District Court for the District of Delaware).
Document STI-1248-001858, filed with Document filed Jun. 30, 2023, "Specified Technologies Inc.'s Invalidity Contentions" in Case 1:22-cv-01248-CJB (in the U.S. District Court for the District of Delaware).
Document STI-1248-001859, filed with Document filed Jun. 30, 2023, "Specified Technologies Inc.'s Invalidity Contentions" in Case 1:22-cv-01248-CJB (in the U.S. District Court for the District of Delaware).
Document STI-1248-001860, filed with Document filed Jun. 30, 2023, "Specified Technologies Inc.'s Invalidity Contentions" in Case 1:22-cv-01248-CJB (in the U.S. District Court for the District of Delaware).
Document STI-1248-001861, filed with Document filed Jun. 30, 2023, "Specified Technologies Inc.'s Invalidity Contentions" in Case 1:22-cv-01248-CJB (in the U.S. District Court for the District of Delaware).
Document STI-1248-001864, filed with Document filed Jun. 30, 2023, "Specified Technologies Inc.'s Invalidity Contentions" in Case 1:22-cv-01248-CJB (in the U.S. District Court for the District of Delaware).
Document STI-1248-001872, filed with Document filed Jun. 30, 2023, "Specified Technologies Inc.'s Invalidity Contentions" in Case 1:22-cv-01248-CJB (in the U.S. District Court for the District of Delaware).
Document STI-1248-001873, filed with Document filed Jun. 30, 2023, "Specified Technologies Inc.'s Invalidity Contentions" in Case 1:22-cv-01248-CJB (in the U.S. District Court for the District of Delaware).
Document STI-1248-001874, filed with Document filed Jun. 30, 2023, "Specified Technologies Inc.'s Invalidity Contentions" in Case 1:22-cv-01248-CJB (in the U.S. District Court for the District of Delaware).
Document STI-1248-001875, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001876, filed with Document filed Jun. 30, 2023, "Specified Technologies Inc.'s Invalidity Contentions" in Case 1:22-cv-01248-CJB (in the U.S. District Court for the District of Delaware).
Document STI-1248-001877, filed with Document filed Jun. 30, 2023, "Specified Technologies Inc.'s Invalidity Contentions" in Case 1:22-cv-01248-CJB (in the U.S. District Court for the District of Delaware).
Document STI-1248-001878, filed with Document filed Jun. 30, 2023, "Specified Technologies Inc.'s Invalidity Contentions" in Case 1:22-cv-01248-CJB (in the U.S. District Court for the District of Delaware).
Document STI-1248-001879, filed with Document filed Jun. 30, 2023, "Specified Technologies Inc.'s Invalidity Contentions" in Case 1:22-cv-01248-CJB (in the U.S. District Court for the District of Delaware).
Document STI-1248-001880, filed with Document filed Jun. 30, 2023, "Specified Technologies Inc.'s Invalidity Contentions" in Case 1:22-cv-01248-CJB (in the U.S. District Court for the District of Delaware).
Document STI-1248-001881, filed with Document filed Jun. 30, 2023, "Specified Technologies Inc.'s Invalidity Contentions" in Case 1:22-cv-01248-CJB (in the U.S. District Court for the District of Delaware).
Document STI-1248-001882, filed with Document filed Jun. 30, 2023, "Specified Technologies Inc.'s Invalidity Contentions" in Case 1:22-cv-01248-CJB (in the U.S. District Court for the District of Delaware).
Document STI-1248-001883, filed with Document filed Jun. 30, 2023, "Specified Technologies Inc.'s Invalidity Contentions" in Case 1:22-cv-01248-CJB (in the U.S. District Court for the District of Delaware).
Document STI-1248-001884, filed with Document filed Jun. 30, 2023, "Specified Technologies Inc.'s Invalidity Contentions" in Case 1:22-cv-01248-CJB (in the U.S. District Court for the District of Delaware).
Document STI-1248-003874, filed with Document filed Jun. 30, 2023, "Specified Technologies Inc.'s Invalidity Contentions" in Case 1:22-cv-01248-CJB (in the U.S. District Court for the District of Delaware).
Document STI-1248-003875, filed with Document filed Jun. 30, 2023, "Specified Technologies Inc.'s Invalidity Contentions" in Case 1:22-cv-01248-CJB (in the U.S. District Court for the District of Delaware).
Document STI-1248-003876, filed with Document filed Jun. 30, 2023, "Specified Technologies Inc.'s Invalidity Contentions" in Case 1:22-cv-01248-CJB (in the U.S. District Court for the District of Delaware).
Document STI-1248-003877, filed with Document filed Jun. 30, 2023, "Specified Technologies Inc.'s Invalidity Contentions" in Case 1:22-cv-01248-CJB (in the U.S. District Court for the District of Delaware).
Document STI-1248-003886, filed with Document filed Jun. 30, 2023, "Specified Technologies Inc.'s Invalidity Contentions" in Case 1:22-cv-01248-CJB (in the U.S. District Court for the District of Delaware).
Document STI-1248-003887, filed with Document filed Jun. 30, 2023, "Specified Technologies Inc.'s Invalidity Contentions" in Case 1:22-cv-01248-CJB (in the U.S. District Court for the District of Delaware).
Document STI-1248-003891, filed with Document filed Jun. 30, 2023, "Specified Technologies Inc.'s Invalidity Contentions" in Case 1:22-cv-01248-CJB (in the U.S. District Court for the District of Delaware).
Document STI-1248-003904, filed with Document filed Jun. 30, 2023, "Specified Technologies Inc.'s Invalidity Contentions" in Case 1:22-cv-01248-CJB (in the U.S. District Court for the District of Delaware).
Document STI-1248-003905, filed with Document filed Jun. 30, 2023, "Specified Technologies Inc.'s Invalidity Contentions" in Case 1:22-cv-01248-CJB (in the U.S. District Court for the District of Delaware).
Document STI-1248-003906, filed with Document filed Jun. 30, 2023, "Specified Technologies Inc.'s Invalidity Contentions" in Case 1:22-cv-01248-CJB (in the U.S. District Court for the District of Delaware).
Document STI-1248-003907, filed with Document filed Jun. 30, 2023, "Specified Technologies Inc.'s Invalidity Contentions" in Case 1:22-cv-01248-CJB (in the U.S. District Court for the District of Delaware).
Document STI-1248-003908, filed with Document filed Jun. 30, 2023, "Specified Technologies Inc.'s Invalidity Contentions" in Case 1:22-cv-01248-CJB (in the U.S. District Court for the District of Delaware).
Document STI-1248-003909, filed with Document filed Jun. 30, 2023, "Specified Technologies Inc.'s Invalidity Contentions" in Case 1:22-cv-01248-CJB (in the U.S. District Court for the District of Delaware).
Document STI-1248-003910, filed with Document filed Jun. 30, 2023, "Specified Technologies Inc.'s Invalidity Contentions" in Case 1:22-cv-01248-CJB (in the U.S. District Court for the District of Delaware).
Document STI-1248-003911, filed with Document filed Jun. 30, 2023, "Specified Technologies Inc.'s Invalidity Contentions" in Case 1:22-cv-01248-CJB (in the U.S. District Court for the District of Delaware).
Document STI-1248-003912, filed with Document filed Jun. 30, 2023, "Specified Technologies Inc.'s Invalidity Contentions" in Case 1:22-cv-01248-CJB (in the U.S. District Court for the District of Delaware).
Document STI-1248-003913, filed with Document filed Jun. 30, 2023, "Specified Technologies Inc.'s Invalidity Contentions" in Case 1:22-cv-01248-CJB (in the U.S. District Court for the District of Delaware).
Document STI-1248-003914, filed with Document filed Jun. 30, 2023, "Specified Technologies Inc.'s Invalidity Contentions" in Case 1:22-cv-01248-CJB (in the U.S. District Court for the District of Delaware).
Document STI-1248-003915, filed with Document filed Jun. 30, 2023, "Specified Technologies Inc.'s Invalidity Contentions" in Case 1:22-cv-01248-CJB (in the U.S. District Court for the District of Delaware).
Document STI-1248-003916, filed with Document filed Jun. 30, 2023, "Specified Technologies Inc.'s Invalidity Contentions" in Case 1:22-cv-01248-CJB (in the U.S. District Court for the District of Delaware).
Document STI-1248-003917, filed with Document filed Jun. 30, 2023, "Specified Technologies Inc.'s Invalidity Contentions" in Case 1:22-cv-01248-CJB (in the U.S. District Court for the District of Delaware).
Document STI-1248-003918, filed with Document filed Jun. 30, 2023, "Specified Technologies Inc.'s Invalidity Contentions" in Case 1:22-cv-01248-CJB (in the U.S. District Court for the District of Delaware).
Document STI-1248-003919, filed with Document filed Jun. 30, 2023, "Specified Technologies Inc.'s Invalidity Contentions" in Case 1:22-cv-01248-CJB (in the U.S. District Court for the District of Delaware).
Document STI-1248-003920, filed with Document filed Jun. 30, 2023, "Specified Technologies Inc.'s Invalidity Contentions" in Case 1:22-cv-01248-CJB (in the U.S. District Court for the District of Delaware).
Document STI-1248-003921, filed with Document filed Jun. 30, 2023, "Specified Technologies Inc.'s Invalidity Contentions" in Case 1:22-cv-01248-CJB (in the U.S. District Court for the District of Delaware).
Document STI-1248-003922, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005440, filed with Document filed Jun. 30, 2023, "Specified Technologies Inc.'s Invalidity Contentions" in Case 1:22-cv-01248-CJB (in the U.S. District Court for the District of Delaware).
Document STI-1248-005441, filed with Document filed Jun. 30, 2023, "Specified Technologies Inc.'s Invalidity Contentions" in Case 1:22-cv-01248-CJB (in the U.S. District Court for the District of Delaware).
Document STI-1248-005480, filed with Document filed Jun. 30, 2023, "Specified Technologies Inc.'s Invalidity Contentions" in Case 1:22-cv-01248-CJB (in the U.S. District Court for the District of Delaware).
Document STI-1248-005481, filed with Document filed Jun. 30, 2023, "Specified Technologies Inc.'s Invalidity Contentions" in Case 1:22-cv-01248-CJB (in the U.S. District Court for the District of Delaware).
Document STI-1248-005482, filed with Document filed Jun. 30, 2023, "Specified Technologies Inc.'s Invalidity Contentions" in Case 1:22-cv-01248-CJB (in the U.S. District Court for the District of Delaware).
Document STI-1248-005483, filed with Document filed Jun. 30, 2023, "Specified Technologies Inc.'s Invalidity Contentions" in Case 1:22-cv-01248-CJB (in the U.S. District Court for the District of Delaware).
Document STI-1248-005484, filed with Document filed Jun. 30, 2023, "Specified Technologies Inc.'s Invalidity Contentions" in Case 1:22-cv-01248-CJB (in the U.S. District Court for the District of Delaware).
Document STI-1248-005486, filed with Document filed Jun. 30, 2023, "Specified Technologies Inc.'s Invalidity Contentions" in Case 1:22-cv-01248-CJB (in the U.S. District Court for the District of Delaware).
Document STI-1248-005495, filed with Document filed Jun. 30, 2023, "Specified Technologies Inc.'s Invalidity Contentions" in Case 1:22-cv-01248-CJB (in the U.S. District Court for the District of Delaware).
Document STI-1248-001779 filed with Document filed Jun. 30, 2023, "Specified Technologies Inc.'s Invalidity Contentions" in Case 1:22-cv-01248-CJB (in the U.S. District Court for the District of Delaware).
Document STI-1248-003734 filed with Document filed Jun. 30, 2023, "Specified Technologies Inc.'s Invalidity Contentions" in Case 1:22-cv-01248-CJB (in the U.S. District Court for the District of Delaware).
Document STI-1248-005362 filed with Document filed Jun. 30, 2023, "Specified Technologies Inc.'s Invalidity Contentions" in Case 1:22-cv-01248-CJB (in the U.S. District Court for the District of Delaware).
Document STI-1248-005372 filed with Document filed Jun. 30, 2023, "Specified Technologies Inc.'s Invalidity Contentions" in Case 1:22-cv-01248-CJB (in the U.S. District Court for the District of Delaware).
Document STI-1248-005420 filed with Document filed Jun. 30, 2023, "Specified Technologies Inc.'s Invalidity Contentions" in Case 1:22-cv-01248-CJB (in the U.S. District Court for the District of Delaware).
Document STI-1248-005442 filed with Document filed Jun. 30, 2023, "Specified Technologies Inc.'s Invalidity Contentions" in Case 1:22-cv-01248-CJB (in the U.S. District Court for the District of Delaware).
Document STI-1248-005443 filed with Document filed Jun. 30, 2023, "Specified Technologies Inc.'s Invalidity Contentions" in Case 1:22-cv-01248-CJB (in the U.S. District Court for the District of Delaware).
Document STI-1248-005444 filed with Document filed Jun. 30, 2023, "Specified Technologies Inc.'s Invalidity Contentions" in Case 1:22-cv-01248-CJB (in the U.S. District Court for the District of Delaware).
Document STI-1248-005453 filed with Document filed Jun. 30, 2023, "Specified Technologies Inc.'s Invalidity Contentions" in Case 1:22-cv-01248-CJB (in the U.S. District Court for the District of Delaware).
Document STI-1248-005455 filed with Document filed Jun. 30, 2023, "Specified Technologies Inc.'s Invalidity Contentions" in Case 1:22-cv-01248-CJB (in the U.S. District Court for the District of Delaware).
Document STI-1248-005464 filed with Document filed Jun. 30, 2023, "Specified Technologies Inc.'s Invalidity Contentions" in Case 1:22-cv-01248-CJB (in the U.S. District Court for the District of Delaware).
Document STI-1248-005465 filed with Document filed Jun. 30, 2023, "Specified Technologies Inc.'s Invalidity Contentions" in Case 1:22-cv-01248-CJB (in the U.S. District Court for the District of Delaware).
Document STI-1248-005466 filed with Document filed Jun. 30, 2023, "Specified Technologies Inc.'s Invalidity Contentions" in Case 1:22-cv-01248-CJB (in the U.S. District Court for the District of Delaware).
Document STI-1248-005467 filed with Document filed Jun. 30, 2023, "Specified Technologies Inc.'s Invalidity Contentions" in Case 1:22-cv-01248-CJB (in the U.S. District Court for the District of Delaware).
Document STI-1248-005468 filed with Document filed Jun. 30, 2023, "Specified Technologies Inc.'s Invalidity Contentions" in Case 1:22-cv-01248-CJB (in the U.S. District Court for the District of Delaware).
Document STI-1248-005469 filed with Document filed Jun. 30, 2023, "Specified Technologies Inc.'s Invalidity Contentions" in Case 1:22-cv-01248-CJB (in the U.S. District Court for the District of Delaware).
Document STI-1248-005470 filed with Document filed Jun. 30, 2023, "Specified Technologies Inc.'s Invalidity Contentions" in Case 1:22-cv-01248-CJB (in the U.S. District Court for the District of Delaware).
Document STI-1248-005471 filed with Document filed Jun. 30, 2023, "Specified Technologies Inc.'s Invalidity Contentions" in Case 1:22-cv-01248-CJB (in the U.S. District Court for the District of Delaware).
Document STI-1248-005472 filed with Document filed Jun. 30, 2023, "Specified Technologies Inc.'s Invalidity Contentions" in Case 1:22-cv-01248-CJB (in the U.S. District Court for the District of Delaware).
Document STI-1248-005473 filed with Document filed Jun. 30, 2023, "Specified Technologies Inc.'s Invalidity Contentions" in Case 1:22-cv-01248-CJB (in the U.S. District Court for the District of Delaware).
Document STI-1248-005474 filed with Document filed Jun. 30, 2023, "Specified Technologies Inc.'s Invalidity Contentions" in Case 1:22-cv-01248-CJB (in the U.S. District Court for the District of Delaware).
Document STI-1248-005475 filed with Document filed Jun. 30, 2023, "Specified Technologies Inc.'s Invalidity Contentions" in Case 1:22-cv-01248-CJB (in the U.S. District Court for the District of Delaware).
Document STI-1248-005476 filed with Document filed Jun. 30, 2023, "Specified Technologies Inc.'s Invalidity Contentions" in Case 1:22-cv-01248-CJB (in the U.S. District Court for the District of Delaware).
Document STI-1248-005477 filed with Document filed Jun. 30, 2023, "Specified Technologies Inc.'s Invalidity Contentions" in Case 1:22-cv-01248-CJB (in the U.S. District Court for the District of Delaware).
Document STI-1248-005478 filed with Document filed Jun. 30, 2023, "Specified Technologies Inc.'s Invalidity Contentions" in Case 1:22-cv-01248-CJB (in the U.S. District Court for the District of Delaware).
Document STI-1248-005479 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005497 filed with Document filed Jun. 30, 2023, "Specified Technologies Inc.'s Invalidity Contentions" in Case 1:22-cv-01248-CJB (in the U.S. District Court for the District of Delaware).
Document STI-1248-005498 filed with Document filed Jun. 30, 2023, "Specified Technologies Inc.'s Invalidity Contentions" in Case 1:22-cv-01248-CJB (in the U.S. District Court for the District of Delaware).
Document STI-1248-005535 filed with Document filed Jun. 30, 2023, "Specified Technologies Inc.'s Invalidity Contentions" in Case 1:22-cv-01248-CJB (in the U.S. District Court for the District of Delaware).
Document STI-1248-005536 filed with Document filed Jun. 30, 2023, "Specified Technologies Inc.'s Invalidity Contentions" in Case 1:22-cv-01248-CJB (in the U.S. District Court for the District of Delaware).
Document STI-1248-005538 filed with Document filed Jun. 30, 2023, "Specified Technologies Inc.'s Invalidity Contentions" in Case 1:22-cv-01248-CJB (in the U.S. District Court for the District of Delaware).
Document STI-1248-005584 filed with Document filed Jun. 30, 2023, "Specified Technologies Inc.'s Invalidity Contentions" in Case 1:22-cv-01248-CJB (in the U.S. District Court for the District of Delaware).
Document STI-1248-005758 filed with Document filed Jun. 30, 2023, "Specified Technologies Inc.'s Invalidity Contentions" in Case 1:22-cv-01248-CJB (in the U.S. District Court for the District of Delaware).
Document STI-1248-003713 filed with Document filed Jun. 30, 2023, "Specified Technologies Inc.'s Invalidity Contentions" in Case 1:22-cv-01248-CJB (in the U.S. District Court for the District of Delaware).
Document STI-1248-003714 filed with Document filed Jun. 30, 2023, "Specified Technologies Inc.'s Invalidity Contentions" in Case 1:22-cv-01248-CJB (in the U.S. District Court for the District of Delaware).
Document STI-1248-003715 filed with Document filed Jun. 30, 2023, "Specified Technologies Inc.'s Invalidity Contentions" in Case 1:22-cv-01248-CJB (in the U.S. District Court for the District of Delaware).
Document STI-1248-003717 filed with Document filed Jun. 30, 2023, "Specified Technologies Inc.'s Invalidity Contentions" in Case 1:22-cv-01248-CJB (in the U.S. District Court for the District of Delaware).
Document STI-1248-003719 filed with Document filed Jun. 30, 2023, "Specified Technologies Inc.'s Invalidity Contentions" in Case 1:22-cv-01248-CJB (in the U.S. District Court for the District of Delaware).
Document STI-1248-003720 filed with Document filed Jun. 30, 2023, "Specified Technologies Inc.'s Invalidity Contentions" in Case 1:22-cv-01248-CJB (in the U.S. District Court for the District of Delaware).
Document STI-1248-003721 filed with Document filed Jun. 30, 2023, "Specified Technologies Inc.'s Invalidity Contentions" in Case 1:22-cv-01248-CJB (in the U.S. District Court for the District of Delaware).
Document STI-1248-003726 filed with Document filed Jun. 30, 2023, "Specified Technologies Inc.'s Invalidity Contentions" in Case 1:22-cv-01248-CJB (in the U.S. District Court for the District of Delaware).
Document STI-1248-004495 filed with Document filed Jun. 30, 2023, "Specified Technologies Inc.'s Invalidity Contentions" in Case 1:22-cv-01248-CJB (in the U.S. District Court for the District of Delaware).
Document STI-1248-004496 filed with Document filed Jun. 30, 2023, "Specified Technologies Inc.'s Invalidity Contentions" in Case 1:22-cv-01248-CJB (in the U.S. District Court for the District of Delaware).
Document STI-1248-004497 filed with Document filed Jun. 30, 2023, "Specified Technologies Inc.'s Invalidity Contentions" in Case 1:22-cv-01248-CJB (in the U.S. District Court for the District of Delaware).
Document STI-1248-005407 filed with Document filed Jun. 30, 2023, "Specified Technologies Inc.'s Invalidity Contentions" in Case 1:22-cv-01248-CJB (in the U.S. District Court for the District of Delaware).
Document STI-1248-005421 filed with Document filed Jun. 30, 2023, "Specified Technologies Inc.'s Invalidity Contentions" in Case 1:22-cv-01248-CJB (in the U.S. District Court for the District of Delaware).
Document STI-1248-005505 filed with Document filed Jun. 30, 2023, "Specified Technologies Inc.'s Invalidity Contentions" in Case 1:22-cv-01248-CJB (in the U.S. District Court for the District of Delaware).
Document STI-1248-005506 filed with Document filed Jun. 30, 2023, "Specified Technologies Inc.'s Invalidity Contentions" in Case 1:22-cv-01248-CJB (in the U.S. District Court for the District of Delaware).
Document STI-1248-005511 filed with Document filed Jun. 30, 2023, "Specified Technologies Inc.'s Invalidity Contentions" in Case 1:22-cv-01248-CJB (in the U.S. District Court for the District of Delaware).
Document STI-1248-005512 filed with Document filed Jun. 30, 2023, "Specified Technologies Inc.'s Invalidity Contentions" in Case 1:22-cv-01248-CJB (in the U.S. District Court for the District of Delaware).
Document STI-1248-005515 filed with Document filed Jun. 30, 2023, "Specified Technologies Inc.'s Invalidity Contentions" in Case 1:22-cv-01248-CJB (in the U.S. District Court for the District of Delaware).
Document STI-1248-005516 filed with Document filed Jun. 30, 2023, "Specified Technologies Inc.'s Invalidity Contentions" in Case 1:22-cv-01248-CJB (in the U.S. District Court for the District of Delaware).
Document STI-1248-005517 filed with Document filed Jun. 30, 2023, "Specified Technologies Inc.'s Invalidity Contentions" in Case 1:22-cv-01248-CJB (in the U.S. District Court for the District of Delaware).
Document STI-1248-005519 filed with Document filed Jun. 30, 2023, "Specified Technologies Inc.'s Invalidity Contentions" in Case 1:22-cv-01248-CJB (in the U.S. District Court for the District of Delaware).
Document STI-1248-005534 filed with Document filed Jun. 30, 2023, "Specified Technologies Inc.'s Invalidity Contentions" in Case 1:22-cv-01248-CJB (in the U.S. District Court for the District of Delaware).
Document STI-1248-005560 filed with Document filed Jun. 30, 2023, "Specified Technologies Inc.'s Invalidity Contentions" in Case 1:22-cv-01248-CJB (in the U.S. District Court for the District of Delaware).
Document STI-1248-005576 filed with Document filed Jun. 30, 2023, "Specified Technologies Inc.'s Invalidity Contentions" in Case 1:22-cv-01248-CJB (in the U.S. District Court for the District of Delaware).
Document STI-1248-004498, filed with Document filed Jun. 30, 2023, "Specified Technologies Inc.'s Invalidity Contentions" in Case 1:22-cv-01248-CJB (in the U.S. District Court for the District of Delaware).
Document STI-1248-004499, filed with Document filed Jun. 30, 2023, "Specified Technologies Inc.'s Invalidity Contentions" in Case 1:22-cv-01248-CJB (in the U.S. District Court for the District of Delaware).
Document STI-1248-004500, filed with Document filed Jun. 30, 2023, "Specified Technologies Inc.'s Invalidity Contentions" in Case 1:22-cv-01248-CJB (in the U.S. District Court for the District of Delaware).
Document STI-1248-004501, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005382, filed with Document filed Jun. 30, 2023, "Specified Technologies Inc.'s Invalidity Contentions" in Case 1:22-cv-01248-CJB (in the U.S. District Court for the District of Delaware).
Document STI-1248-005393, filed with Document filed Jun. 30, 2023, "Specified Technologies Inc.'s Invalidity Contentions" in Case 1:22-cv-01248-CJB (in the U.S. District Court for the District of Delaware).
Document STI-1248-005408, filed with Document filed Jun. 30, 2023, "Specified Technologies Inc.'s Invalidity Contentions" in Case 1:22-cv-01248-CJB (in the U.S. District Court for the District of Delaware).
Document STI-1248-005409, filed with Document filed Jun. 30, 2023, "Specified Technologies Inc.'s Invalidity Contentions" in Case 1:22-cv-01248-CJB (in the U.S. District Court for the District of Delaware).
Document STI-1248-005418, filed with Document filed Jun. 30, 2023, "Specified Technologies Inc.'s Invalidity Contentions" in Case 1:22-cv-01248-CJB (in the U.S. District Court for the District of Delaware).
Document STI-1248-005445, filed with Document filed Jun. 30, 2023, "Specified Technologies Inc.'s Invalidity Contentions" in Case 1:22-cv-01248-CJB (in the U.S. District Court for the District of Delaware).
Document STI-1248-005449, filed with Document filed Jun. 30, 2023, "Specified Technologies Inc.'s Invalidity Contentions" in Case 1:22-cv-01248-CJB (in the U.S. District Court for the District of Delaware).
Document STI-1248-005451, filed with Document filed Jun. 30, 2023, "Specified Technologies Inc.'s Invalidity Contentions" in Case 1:22-cv-01248-CJB (in the U.S. District Court for the District of Delaware).
Document STI-1248-005490, filed with Document filed Jun. 30, 2023, "Specified Technologies Inc.'s Invalidity Contentions" in Case 1:22-cv-01248-CJB (in the U.S. District Court for the District of Delaware).
Document STI-1248-005496, filed with Document filed Jun. 30, 2023, "Specified Technologies Inc.'s Invalidity Contentions" in Case 1:22-cv-01248-CJB (in the U.S. District Court for the District of Delaware).
Document STI-1248-005503, filed with Document filed Jun. 30, 2023, "Specified Technologies Inc.'s Invalidity Contentions" in Case 1:22-cv-01248-CJB (in the U.S. District Court for the District of Delaware).
Document STI-1248-005504, filed with Document filed Jun. 30, 2023, "Specified Technologies Inc.'s Invalidity Contentions" in Case 1:22-cv-01248-CJB (in the U.S. District Court for the District of Delaware).
Document STI-1248-005507, filed with Document filed Jun. 30, 2023, "Specified Technologies Inc.'s Invalidity Contentions" in Case 1:22-cv-01248-CJB (in the U.S. District Court for the District of Delaware).
Document STI-1248-005508, filed with Document filed Jun. 30, 2023, "Specified Technologies Inc.'s Invalidity Contentions" in Case 1:22-cv-01248-CJB (in the U.S. District Court for the District of Delaware).
Document STI-1248-005509, filed with Document filed Jun. 30, 2023, "Specified Technologies Inc.'s Invalidity Contentions" in Case 1:22-cv-01248-CJB (in the U.S. District Court for the District of Delaware).
Document STI-1248-005510, filed with Document filed Jun. 30, 2023, "Specified Technologies Inc.'s Invalidity Contentions" in Case 1:22-cv-01248-CJB (in the U.S. District Court for the District of Delaware).
Document STI-1248-005513, filed with Document filed Jun. 30, 2023, "Specified Technologies Inc.'s Invalidity Contentions" in Case 1:22-cv-01248-CJB (in the U.S. District Court for the District of Delaware).
Document STI-1248-005514, filed with Document filed Jun. 30, 2023, "Specified Technologies Inc.'s Invalidity Contentions" in Case 1:22-cv-01248-CJB (in the U.S. District Court for the District of Delaware).
Document STI-1248-005518, filed with Document filed Jun. 30, 2023, "Specified Technologies Inc.'s Invalidity Contentions" in Case 1:22-cv-01248-CJB (in the U.S. District Court for the District of Delaware).
Document STI-1248-005520, filed with Document filed Jun. 30, 2023, "Specified Technologies Inc.'s Invalidity Contentions" in Case 1:22-cv-01248-CJB (in the U.S. District Court for the District of Delaware).
Document STI-1248-005521, filed with Document filed Jun. 30, 2023, "Specified Technologies Inc.'s Invalidity Contentions" in Case 1:22-cv-01248-CJB (in the U.S. District Court for the District of Delaware).
Document STI-1248-005522, filed with Document filed Jun. 30, 2023, "Specified Technologies Inc.'s Invalidity Contentions" in Case 1:22-cv-01248-CJB (in the U.S. District Court for the District of Delaware).
Document STI-1248-005529, filed with Document filed Jun. 30, 2023, "Specified Technologies Inc.'s Invalidity Contentions" in Case 1:22-cv-01248-CJB (in the U.S. District Court for the District of Delaware).
Document STI-1248-005530, filed with Document filed Jun. 30, 2023, "Specified Technologies Inc.'s Invalidity Contentions" in Case 1:22-cv-01248-CJB (in the U.S. District Court for the District of Delaware).
Document STI-1248-005531, filed with Document filed Jun. 30, 2023, "Specified Technologies Inc.'s Invalidity Contentions" in Case 1:22-cv-01248-CJB (in the U.S. District Court for the District of Delaware).
Document STI-1248-005532, filed with Document filed Jun. 30, 2023, "Specified Technologies Inc.'s Invalidity Contentions" in Case 1:22-cv-01248-CJB (in the U.S. District Court for the District of Delaware).
Document STI-1248-005533, filed with Document filed Jun. 30, 2023, "Specified Technologies Inc.'s Invalidity Contentions" in Case 1:22-cv-01248-CJB (in the U.S. District Court for the District of Delaware).
Document STI-1248-005539, filed with Document filed Jun. 30, 2023, "Specified Technologies Inc.'s Invalidity Contentions" in Case 1:22-cv-01248-CJB (in the U.S. District Court for the District of Delaware).
Document STI-1248-005551, filed with Document filed Jun. 30, 2023, "Specified Technologies Inc.'s Invalidity Contentions" in Case 1:22-cv-01248-CJB (in the U.S. District Court for the District of Delaware).
Document STI-1248-005568, filed with Document filed Jun. 30, 2023, "Specified Technologies Inc.'s Invalidity Contentions" in Case 1:22-cv-01248-CJB (in the U.S. District Court for the District of Delaware).
Document STI-1248-005591, filed with Document filed Jun. 30, 2023, "Specified Technologies Inc.'s Invalidity Contentions" in Case 1:22-cv-01248-CJB (in the U.S. District Court for the District of Delaware).
Document STI-1248-005609, filed with Document filed Jun. 30, 2023, "Specified Technologies Inc.'s Invalidity Contentions" in Case 1:22-cv-01248-CJB (in the U.S. District Court for the District of Delaware).
Document STI-1248-005419 filed with Document filed Jun. 30, 2023, "Specified Technologies Inc.'s Invalidity Contentions" in Case 1:22-cv-01248-CJB (in the U.S. District Court for the District of Delaware).
Document STI-1248-005431 filed with Document filed Jun. 30, 2023, "Specified Technologies Inc.'s Invalidity Contentions" in Case 1:22-cv-01248-CJB (in the U.S. District Court for the District of Delaware).
Document STI-1248-005438 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005447 filed with Document filed Jun. 30, 2023, "Specified Technologies Inc.'s Invalidity Contentions" in Case 1:22-cv-01248-CJB (in the U.S. District Court for the District of Delaware).
Document STI-1248-005499 filed with Document filed Jun. 30, 2023, "Specified Technologies Inc.'s Invalidity Contentions" in Case 1:22-cv-01248-CJB (in the U.S. District Court for the District of Delaware).
Document STI-1248-005500 filed with Document filed Jun. 30, 2023, "Specified Technologies Inc.'s Invalidity Contentions" in Case 1:22-cv-01248-CJB (in the U.S. District Court for the District of Delaware).
Document STI-1248-005501 filed with Document filed Jun. 30, 2023, "Specified Technologies Inc.'s Invalidity Contentions" in Case 1:22-cv-01248-CJB (in the U.S. District Court for the District of Delaware).
Document STI-1248-005502 filed with Document filed Jun. 30, 2023, "Specified Technologies Inc.'s Invalidity Contentions" in Case 1:22-cv-01248-CJB (in the U.S. District Court for the District of Delaware).
Document STI-1248-005537 filed with Document filed Jun. 30, 2023, "Specified Technologies Inc.'s Invalidity Contentions" in Case 1:22-cv-01248-CJB (in the U.S. District Court for the District of Delaware).
Document STI-1248-000075, filed with Document filed Jun. 30, 2023, "Specified Technologies Inc.'s Invalidity Contentions" in Case 1:22-cv-01248-CJB (in the U.S. District Court for the District of Delaware).
Document STI-1248-000082, filed with Document filed Jun. 30, 2023, "Specified Technologies Inc.'s Invalidity Contentions" in Case 1:22-cv-01248-CJB (in the U.S. District Court for the District of Delaware).
Document STI-1248-001721, filed with Document filed Jun. 30, 2023, "Specified Technologies Inc.'s Invalidity Contentions" in Case 1:22-cv-01248-CJB (in the U.S. District Court for the District of Delaware).
Document STI-1248-003584, filed with Document filed Jun. 30, 2023, "Specified Technologies Inc.'s Invalidity Contentions" in Case 1:22-cv-01248-CJB (in the U.S. District Court for the District of Delaware).
Document STI-1248-003590, filed with Document filed Jun. 30, 2023, "Specified Technologies Inc.'s Invalidity Contentions" in Case 1:22-cv-01248-CJB (in the U.S. District Court for the District of Delaware).
Document STI-1248-003591, filed with Document filed Jun. 30, 2023, "Specified Technologies Inc.'s Invalidity Contentions" in Case 1:22-cv-01248-CJB (in the U.S. District Court for the District of Delaware).
Document STI-1248-003592, filed with Document filed Jun. 30, 2023, "Specified Technologies Inc.'s Invalidity Contentions" in Case 1:22-cv-01248-CJB (in the U.S. District Court for the District of Delaware).
Document STI-1248-003593, filed with Document filed Jun. 30, 2023, "Specified Technologies Inc.'s Invalidity Contentions" in Case 1:22-cv-01248-CJB (in the U.S. District Court for the District of Delaware).
Document STI-1248-003594, filed with Document filed Jun. 30, 2023, "Specified Technologies Inc.'s Invalidity Contentions" in Case 1:22-cv-01248-CJB (in the U.S. District Court for the District of Delaware).
Document STI-1248-003595, filed with Document filed Jun. 30, 2023, "Specified Technologies Inc.'s Invalidity Contentions" in Case 1:22-cv-01248-CJB (in the U.S. District Court for the District of Delaware).
Document STI-1248-003596, filed with Document filed Jun. 30, 2023, "Specified Technologies Inc.'s Invalidity Contentions" in Case 1:22-cv-01248-CJB (in the U.S. District Court for the District of Delaware).
Document STI-1248-003647, filed with Document filed Jun. 30, 2023, "Specified Technologies Inc.'s Invalidity Contentions" in Case 1:22-cv-01248-CJB (in the U.S. District Court for the District of Delaware).
Document filed Sep. 14, 2023, "Specified Technologies Inc.'s Invalidity Contentions" in Case 1:23-cv-00244-CJB (in the U.S. District Court for the District of Delaware).
Exhibit R-1 to Document filed Sep. 14, 2023, "Specified Technologies Inc.'s Invalidity Contentions" in Case 1:23-cv-00244-CJB (in the U.S. District Court for the District of Delaware).
Exhibit R-2 to Document filed Sep. 14, 2023, "Specified Technologies Inc.'s Invalidity Contentions" in Case 1:23-cv-00244-CJB (in the U.S. District Court for the District of Delaware).
Exhibit R-3 to Document filed Sep. 14, 2023, "Specified Technologies Inc.'s Invalidity Contentions" in Case 1:23-cv-00244-CJB (in the U.S. District Court for the District of Delaware).
Exhibit R-4 to Document filed Sep. 14, 2023, "Specified Technologies Inc.'s Invalidity Contentions" in Case 1:23-cv-00244-CJB (in the U.S. District Court for the District of Delaware).
Exhibit R-5 to Document filed Sep. 14, 2023, "Specified Technologies Inc.'s Invalidity Contentions" in Case 1:23-cv-00244-CJB (in the U.S. District Court for the District of Delaware).
Exhibit R-6 to Document filed Sep. 14, 2023, "Specified Technologies Inc.'s Invalidity Contentions" in Case 1:23-cv-00244-CJB (in the U.S. District Court for the District of Delaware).
Exhibit R-7 to Document filed Sep. 14, 2023, "Specified Technologies Inc.'s Invalidity Contentions" in Case 1:23-cv-00244-CJB (in the U.S. District Court for the District of Delaware).
Exhibit R-8 to Document filed Sep. 14, 2023, "Specified Technologies Inc.'s Invalidity Contentions" in Case 1:23-cv-00244-CJB (in the U.S. District Court for the District of Delaware).
Exhibit R-9 to Document filed Sep. 14, 2023, "Specified Technologies Inc.'s Invalidity Contentions" in Case 1:23-cv-00244-CJB (in the U.S. District Court for the District of Delaware).
Exhibit R-10 to Document filed Sep. 14, 2023, "Specified Technologies Inc.'s Invalidity Contentions" in Case 1:23-cv-00244-CJB (in the U.S. District Court for the District of Delaware).
Exhibit R-11 to Document filed Sep. 14, 2023, "Specified Technologies Inc.'s Invalidity Contentions" in Case 1:23-cv-00244-CJB (in the U.S. District Court for the District of Delaware).
Exhibit R-12 to Document filed Sep. 14, 2023, "Specified Technologies Inc.'s Invalidity Contentions" in Case 1:23-cv-00244-CJB (in the U.S. District Court for the District of Delaware).
Exhibit R-13 to Document filed Sep. 14, 2023, "Specified Technologies Inc.'s Invalidity Contentions" in Case 1:23-cv-00244-CJB (in the U.S. District Court for the District of Delaware).
Exhibit R-14 to Document filed Sep. 14, 2023, "Specified Technologies Inc.'s Invalidity Contentions" in Case 1:23-cv-00244-CJB (in the U.S. District Court for the District of Delaware).
Exhibit R-15 to Document filed Sep. 14, 2023, "Specified Technologies Inc.'s Invalidity Contentions" in Case 1:23-cv-00244-CJB (in the U.S. District Court for the District of Delaware).
Exhibit R-16 to Document filed Sep. 14, 2023, "Specified Technologies Inc.'s Invalidity Contentions" in Case 1:23-cv-00244-CJB (in the U.S. District Court for the District of Delaware).
Exhibit R-17 to Document filed Sep. 14, 2023, "Specified Technologies Inc.'s Invalidity Contentions" in Case 1:23-cv-00244-CJB (in the U.S. District Court for the District of Delaware).
Exhibit R-18 to Document filed Sep. 14, 2023, "Specified Technologies Inc.'s Invalidity Contentions" in Case 1:23-cv-00244-CJB (in the U.S. District Court for the District of Delaware).
Exhibit R-19 to Document filed Sep. 14, 2023, "Specified Technologies Inc.'s Invalidity Contentions" in Case 1:23-cv-00244-CJB (in the U.S. District Court for the District of Delaware).
Exhibit R-20 to Document filed Sep. 14, 2023, "Specified Technologies Inc.'s Invalidity Contentions" in Case 1:23-cv-00244-CJB (in the U.S. District Court for the District of Delaware).
Exhibit S to Document filed Sep. 14, 2023, "Specified Technologies Inc.'s Invalidity Contentions" in Case 1:23-cv-00244-CJB (in the U.S. District Court for the District of Delaware).

* cited by examiner

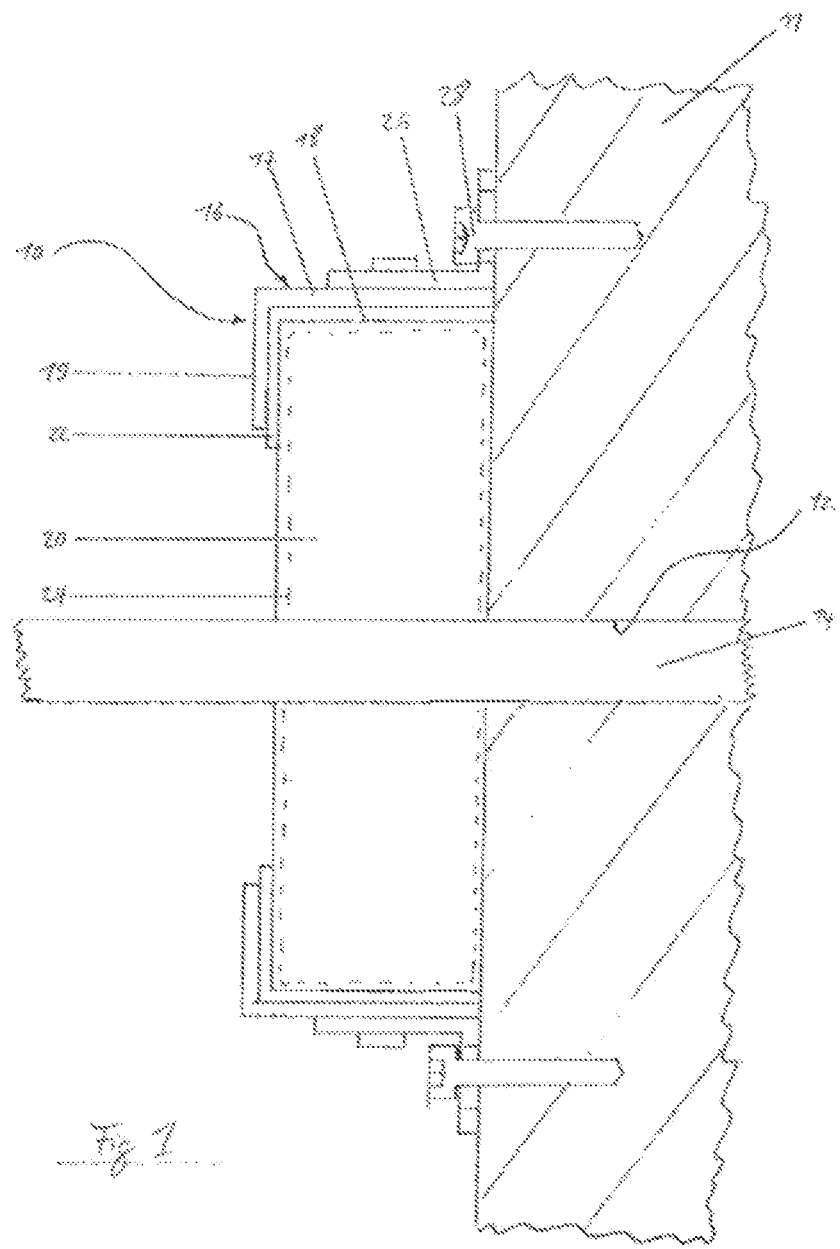

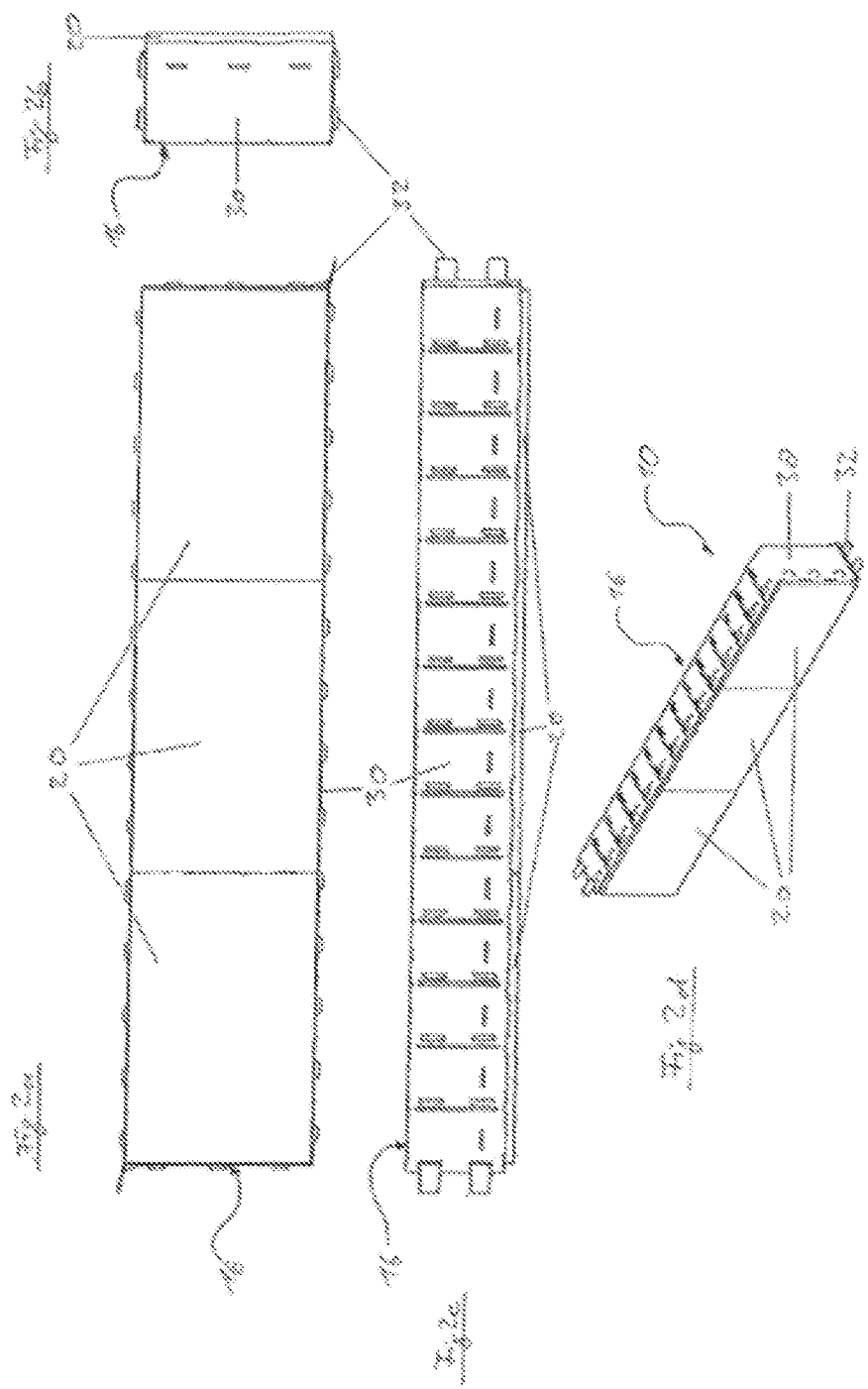

FIRE PROTECTION SLEEVE

CROSS-REFERENCE TO RELATED APPLICATIONS

This application is a Continuation of U.S. patent application Ser. No. 17/468,972, filed on Sep. 8, 2021, which is a Continuation of U.S. patent application Ser. No. 16/829,035, filed on Mar. 25, 2020, which is a Continuation of U.S. Patent application Ser. No. 16/292,429, filed on Mar. 5, 2019, which is a Continuation of U.S. patent application Ser. No. 15/568,562, filed Oct. 23, 2017, which is a National Stage entry under § 371 of International Application No. PCT/EP2016/059344, filed on Apr. 27, 2016 and which claims the benefit of European Application No. 15165180.9, filed on Apr. 27, 2015, the contents of each of which is incorporated by reference herein in its entirety.

BACKGROUND OF THE INVENTION

Field of the Invention

The invention relates to a firestop collar for sealing of openings, especially of line penetrations, that pass through walls or ceilings, with a frame and a block of optionally intumescent material disposed therein.

Description of Related Art

Firestop collars, which are capable of sealing line penetrations of non-fire-resistant pipes or cables in ceilings or walls in the event of fire, in order to prevent the spread of fire and smoke in buildings, are known in the most diverse configurations. The firestop collars usually contain an intumescent material, which is disposed around the lines, and a frame of sheet metal, which jackets the intumescent material and serves to fasten the intumescent material to walls or ceilings. The firestop collars are usually attached around the penetrating lines upstream from the openings, since mounting is simpler there.

As an example, DE 10 2011 089 531 A1 discloses a firestop collar of the type mentioned in the introduction, consisting of a block of intumescent material and a frame surrounding this.

EP 2 455 135 A2 teaches a fire-protection element which, in addition to the intumescent material, has a reinforcing inlay, which stabilizes the ash layer formed in the event of fire.

SUMMARY OF THE INVENTION

A disadvantage of the known firestop collars is that they are suitable only for small opening cross sections, because in the case of large cross sections the fire-protection element becomes unstable and the ash crust is able to fall out of the frame. This leads to much poorer fire-protection properties and therefore makes known firestop collars unsuitable for large opening cross sections. The object of the invention is to provide a firestop collar that ensures reliable fire protection even in the case of larger opening cross sections.

To solve this object, it is provided, in a firestop collar of the type mentioned in the introduction, that an intumescent inlay is disposed between block and the frame.

BRIEF DESCRIPTION OF THE DRAWINGS

FIG. 1 shows a sectional view of a first embodiment of the inventive firestop collar, which has been attached upstream from a line penetration.

FIG. 2a shows a top view, in the direction of the face bearing on the wall, of a firestop collar with a frame of modular construction according to a second embodiment of the invention.

FIG. 2b shows a first side view of the second embodiment of the inventive firestop collar.

FIG. 2c shows a second side view of the second embodiment of the inventive firestop collar.

FIG. 2d shows a perspective view of the second embodiment of the inventive firestop collar.

DETAILED DESCRIPTION OF THE INVENTION

In the event of fire, the heat causes the intumescent inlay to be activated and to expand. Preferably the block consists of intumescent material, so that, by using, for the intumescent inlay and the block of optionally intumescent material, various intumescent materials with different properties, for example with respect to activation temperature and expansion behavior, the pressure variations can be adapted in such a way over the duration of the fire that the stability of the resulting ash crust of the optionally intumescent block is improved. These features make it possible to cover much larger opening cross sections with this firestop collar, without causing the stability problems known from the prior art to occur. In particular, opening sizes ranging from 100 mm×300 mm up to 150 mm×750 mm can be sealed with the inventive firestop collar.

The frame of the firestop collar may have a plurality of side portions that surround the block of optionally intumescent material on its side rims, as well as a plurality of front portions extending perpendicularly relative to the side portions. This configuration of the frame ensures that the block of optionally intumescent material is securely fastened and in the event of fire expands directionally, in order to bring its fire-protection properties optimally into effect.

The height of the block of optionally intumescent material is preferably slightly greater than the height of the side portions. Hereby the firestop collar has a projecting length of optionally intumescent material on the wall side, and so this is pressed with preload against the surface of the wall or ceiling during mounting.

Preferably, this projecting length is 2 mm to 6 mm, which leads to an optimum contact pressure effect.

In a preferred embodiment, the intumescent inner liner extends along at least one of the side portions. Alternatively, the intumescent inlay may also extend additionally, even along the front portion allocated to the side portion. Due to this configuration, the active forces that the intumescent inlay exerts on the block of optionally intumescent material are advantageously directed, namely toward the interior and toward the wall or ceiling.

In one embodiment, the block consists of a foamable material. Hereby sound absorption is also ensured in addition to imperviousness to smoke gas. In one preferred embodiment, the block consists of a foamable binding agent, which contains at least one ash-forming and optionally intumescent mixture. This binding agent acts as a composite-forming carrier for the ash-forming and optionally intumescent mixture. Preferably, the mixture is distributed homogeneously in the binding agent. The composite-forming carrier is preferably chosen from the group consisting of polyurethanes, phenol resins, polystyrenes, polyolefins such as polyethylene and/or polybutylene, melamine resins, melamine resin foams, synthetic or natural rubber, cellulose, elastomers and mixtures thereof, wherein polyurethanes are preferred.

The ash-forming and optionally intumescent mixture comprises the fire-protection additives that are common and known to the person skilled in the art and that foam up in the event of fire, i.e. under the effect of heat, and while doing so form a foam, such as an intumescent material on the basis of an acid-forming agent, a carbon-producing compound and a blowing agent, that prevents the spread of flames.

Preferably the intumescent material comprises, as acid-forming agent, a salt or an ester of an inorganic, nonvolatile acid chosen from among sulfuric acid, phosphoric acid and boric acid, as carbon-producing compound, a polyhydroxy compound and/or a thermoplastic or thermosetting polymeric resin binding agent, and, as blowing agent, a chloroparaffin, melamine, a melamine compound, especially melamine cyanurate, melamine phosphate, melamine polyphosphate, tris(hydroxyethyl)cyanurate, cyanamide, dicyanamide, dicyandiamide, biguanidine and/or a guanidine salt, especially guanidine phosphate or guanidine sulfate.

The composite-forming carrier may further contain, as ablative additive, an inorganic compound, which has incorporated water. e.g. as water of crystallization, and does not dry out at temperatures up to 100° C. but releases the water starting at 120° C. in the event of fire and thereby is able to cool temperature-conducting parts, wherein the said compound is preferably an inorganic hydroxide or hydrate, especially aluminum hydroxide, aluminum oxide hydrates or partly hydrated aluminum hydroxides, which release water at fire temperature or when exposed to flames. Other inorganic hydroxides or hydrates that release water when exposed to flames may also be considered, however, such as are described in EP 0 274 068 A2.

Such compounds, which may be used as the mixture in the inventive fire-protection inlay, are known to the person skilled in the art and, for example, are disclosed in the following publications, to which reference is expressly made herewith: DE 30 25 309 A1, DE 30 41 731 A1, DE 33 02 416 A1, DE 34 11 327 A1, EP 0 043 952 B1, EP0 051 106 B1, EP0 061 024 B1, EP0 116 846 B1, EP0 158 165 B1, EP0 274 068 A2, EP 1 347 549 A1, EP 1 641 895 B1 and DE 196 53 503 A1.

The molded block is produced by foam molding, such as reaction injection molding (RIM) with foam, corresponding to DE 3917518, e.g. with Fomox® fire-protection foam or with HILTI CP 65GN, a construction material that forms an insulating layer. Materials that can be used for inventive purposes are known from EP 0061024 A1, EP 0051106 A1, EP 0043952 A1, EP 0158165 A1, EP 0116848 A1 and U.S. Pat. No. 3,396,129 A as well as EP 1347549 A1. Preferably, the molded block consists of an intumescent-capable polyurethane foam, such as is known from EP 0061024 A1, DE 3025309 A1, DE 3041731 A1, DE 3302416 A and DE 3411 327 A1.

The block of optionally intumescent material is preferably provided with a reinforcing inlay. This reinforcing inlay serves for stabilization of the intumescent crust formed in the event of fire, and it helps to prevent parts of this from falling out of the firestop collar. For this purpose, it is advantageous to position the reinforcing inlay in the surface of the block of optionally intumescent material, in order to stabilize the outer faces.

The reinforcing inlay is preferably formed by a mat, a mesh or a fabric. Such a construction offers good penetration of the block of optionally intumescent material, and the reinforcing inlay retains its stabilizing properties even if structural damage is sporadically present.

In a preferred embodiment, the reinforcing inlay consists of a temperature-resistant material, for example metal, glass fibers, basalt fibers, carbon fibers or ceramic fibers. A hybrid structure comprising several materials in the reinforcing inlay is also possible. The higher temperature resistance compared with the intumescent material is advantageous, since the reinforcing inlay is not impaired by the temperature that activates the intumescent material and so is able to exert its stabilizing function in this way.

In a further preferred embodiment, the reinforcing inlay consists of expanded metal. This is advantageous with respect to the stabilizing effect.

The firestop collar is preferably fastened by means of a plurality of fastening brackets on its side portions. These permit secure fastening of the firestop collar to walls and ceilings and, for example, they can be joined to the side portions via plug-type means. For fastening, the firestop collar may be placed directly on the wall. An additional frame is not necessary, nor is double framing. It is also possible to mount the firestop collar directly over an already present firewall, so that it acts as a repair wall.

In a preferred embodiment, the block of optionally intumescent material of the firestop collar is a molded part and is inserted in one or more pieces into the frame and is built-in together therewith. The molded parts may have any desired shape, but are preferably regular polyhedra, for example cuboids. This has the advantage that the number of blocks used for the firestop collar can be matched easily to the opening to be sealed. The reduction of the molded parts to a few modular common parts offers further advantages beyond this from the logistical and economic perspective.

In an alternative embodiment, the firestop collar is formed by first mounting the frame and then introducing the block of optionally intumescent material by means of a foam material with optionally intumescent properties, wherein the foam material is a foamable material, such as an in-situ foam, for example, that is introduced into the frame and then fills it by foaming up. The advantage of this approach is that only the foam material instead of molded parts has to be kept in readiness, and an individually adapted block of optionally intumescent material is obtained automatically by foaming the frame in place.

In a preferred embodiment, the frame of the firestop collar is of modular construction. This means in particular that this is constructed from a few common parts and can be configured in diverse ways. This has the advantage that the frame can be adapted individually in place to the opening cross section and that efficient use of material is possible. In addition, a reduction of the parts from which the frame is constructed to a few modular common parts offers further advantages beyond this from the logistical and economic perspective.

Preferably, the frame of the firestop collar consists of a plurality of individual parts, which are joined to one another by a plug-type connector. Thus, when the frame is dismantled into individual parts, it may be transported in compact form and mounted simply by the plug-type connectors.

In a further embodiment, the frame of the firestop collar is formed from one continuous strip, which is cut to the desired length and the end of which is joined to its beginning. In this way, the frame can be adapted individually to various opening cross sections.

Further advantages and features will become obvious from the description hereinafter in conjunction with the attached drawings, wherein:

FIG. 1 shows a first embodiment of a firestop collar 10, which is attached at an opening, e.g. in a wall 11, upstream from a line penetration 12 of a line 14. The firestop collar contains a frame 16, a block 20 of optionally intumescent material located therein and an intumescent inlay 22 disposed therebetween, and is joined to wall 11 via fastening brackets 26. As an example, line 14 is a water pipe of plastic or contains one or more cables.

Frame 16 has a plurality of side portions 17, which surround block 20 on its side rims 18 and relative to which a plurality of front portions 19 extends perpendicularly. On the side facing away from block 20, a plurality of fastening brackets 26 is provided on these side portions 17.

Block 20 has a reinforcing inlay 24, which preferably is integrated into the outer surface of block 20. The reinforcing inlay 24 may be formed by a mat, a mesh or a fabric.

Preferably, reinforcing inlay 24 consists of particularly temperature-resistant material, such as metal, glass fibers, basalt fibers, carbon fibers, ceramic fibers or a hybrid material, for example.

Alternatively, expanded metal may be used for reinforcing inlay 24.

Block 20 may be provided as a molded part, for example in the form of a cuboid. In this case, block 20 is preferably slightly larger than frame 16 surrounding it, in order to guarantee secure seating of block 20 in frame 16. In particular, block 20 is 2 mm to 6 mm higher than side portions 17, and, by virtue of this projecting length toward the wall side, it may be mounted in such a way on wall 11 that the intumescent material is pressed with preload against the surface.

Alternatively, block 20 may also be formed by a foam material introduced into frame 16. For this purpose, frame 16 including intumescent inlay 22 is first fastened upstream from line penetration 12 and then the space surrounded by frame 16 is filled by injection molding with an intumescent foam material. Depending on configuration, reinforcing inlay 24 may be introduced at various points in time.

Intumescent inlay 22 is fixed between frame 16 and block 20 and extends along side portions 17 and the respective front portions 19.

Fastening brackets 26, which consist of angled sheet-metal, for example, are joined on the outside of frame 16 to side portions 17. As an example, this joint may be made in the form of a plug-type connector by means of brackets or else via additional fastening elements, such as screws or rivets.

By means of fasteners 28, firestop collar 10 can be fastened to wall 11 via fastening brackets 26 attached to side portions 17. For example, by the fact that screws are used as fasteners 28, the preload of firestop collar 10 can be adjusted by tightening these.

FIGS. 2a to 2d show a second embodiment of a firestop collar 10 in various views, wherein frame 16 is of modular construction and preferably consists of a plurality of individual parts 30, which are joined to one another by plug-type connectors 32.

In the illustrated variant, firestop collar 10 consists of three rectangular blocks 20 of optionally intumescent material and one frame 16 of two L-shaped individual parts 30. These L-shaped individual parts 30 may also be straight strips, which in particular were bent in place at right angles, in order to form a frame 16 adapted to the opening cross section.

In one embodiment (not illustrated), frame 16 is formed from one continuous strip, which is cut to the desired length and joined at its ends.

In one embodiment (not illustrated), firestop collar 10 consists of at least two parts, wherein only one part, especially one half, may also be used as a fully effective firestop collar 10.

In particular, firestop collar 10 is dimensioned such that fire-resistance class EI 120 is achieved even for walls with a thickness of 100 mm.

In the marketplace, moreover, it is possible to offer firestop collar 10 not only as a complete set but also as individual parts thereof. In particular, frame 16 and block of optionally intumescent material may be sold individually.

The invention claimed is:

1. A firestop apparatus, comprising:
a frame with an open front end and an open rear end;
a block disposed within the frame between the open front end and the open rear end, the block having a first thickness and comprising a first material, the block having a first passageway extending between the open front end and the open rear end; and
an inlay disposed between the open front end of the frame and a front surface of the block, the inlay comprising a second passageway aligned with the first passageway of the block and comprising a second material of a second thickness different from the first thickness,
wherein the first passageway and the second passageway are occupied by at least one line in an installed state that allows the at least one line to pass through the open front end and the open rear end of the frame,
wherein a width of the open front end of the frame is greater than a width of the first passageway, and
wherein a length of the frame from the open front end to the open rear end is less than the width of the open front end of the frame, and
wherein an inner surface of the block forms the first passageway, and the inner surface is open to and directly engages the line in the installed state.

2. The firestop apparatus of claim 1, wherein the first thickness is greater than the second thickness.

3. The firestop apparatus of claim 1, wherein the first material is different from the second material.

4. The firestop apparatus of claim 1, wherein the first material of the block comprises a fire-resistant material.

5. The firestop apparatus of claim 4, wherein the fire-resistant material comprises an intumescent material which expands into at least the first passageway when exposed to heat.

6. The firestop apparatus of claim 1, wherein:
the open front end of the frame is in a first plane,
a front surface of the block is in a second plane, and
the first plane is substantially parallel to the second plane.

7. The firestop apparatus of claim 1, wherein:
the open rear end of the frame is in a first plane,
a rear surface of the block is in a second plane, and
the first plane is substantially parallel to the second plane.

8. The firestop apparatus of claim 1, wherein:
the block is in a first plane,
the inlay is in a second plane,
the open rear end of the frame is in a third plane, and
the first plane, the second plane, and the third plane are substantially parallel to one another.

9. The firestop apparatus of claim 1, further comprising:
a fastener bracket configured to couple the frame to a mounting surface.

10. The firestop apparatus of claim 9, wherein the fastener bracket is coupled to a side surface of the frame.

11. The firestop apparatus of claim 1, wherein the frame comprises a rigid material.

12. The firestop apparatus of claim 1, wherein the block is in contact with the inlay in at least the installed state.

13. The firestop apparatus of claim 1, wherein the frame comprises a modular construction.

14. The firestop apparatus of claim 1, wherein the inlay is exposed to view through the open front end of the frame in the installed state.

15. A firestop apparatus, comprising:
- a frame comprising two rigid parts, each comprising a right-angle structure, the frame having an open front end and an open rear end;
- a block disposed within the frame between the open front end and the open rear end, the block having a first thickness and comprising a first material, the block having a first passageway extending between the open front end and the open rear end; and
- an inlay disposed between the open front end of the frame and a front surface of the block, the inlay comprising a second passageway aligned with the first passageway of the block and comprising a second material of a second thickness different from the first thickness,
- wherein the first passageway and the second passageway are occupied by at least one line in an installed state that allows the at least one line to pass through the open front end and the open rear end of the frame,
- wherein a width of the open front end of the frame is greater than a width of the first passageway,
- wherein a length of the frame from the open front end to the open rear end is less than the width of the open front end of the frame,
- wherein the open front end of the frame is in a first plane, a surface of the inlay is in a second plane, a front surface of the block is in a third plane, a rear surface of the block is in a fourth plane, and the open rear end of the frame is in a fifth plane, and
- wherein the first plane, the second plane, the third plane, the fourth plane, and the fifth plane are substantially parallel to one another, and
- wherein an inner surface of the block forms the first passageway, and the inner surface is open to and directly engages the line in the installed state.

16. The firestop apparatus of claim 1, wherein the frame comprises at least one front portion extending perpendicularly inward into the open front end.

17. The firestop apparatus of claim 15, wherein the frame comprises at least one front portion extending perpendicularly inward into the open front end.

* * * * *